US012786958B2

(12) United States Patent
Liu et al.

(10) Patent No.: US 12,786,958 B2
(45) Date of Patent: Nov. 3, 2026

(54) RISK AND INTERFERENCE AWARE CITIZENS BROADBAND RADIO SERVICE CARRIER BANDWIDTH SELECTION

(71) Applicant: Dell Products L.P., Round Rock, TX (US)

(72) Inventors: Jia Liu, Newmarket (CA); Umair Sajid Hashmi, Mississauga (CA); Ravi Sharma, Cupertino, CA (US); Yogesh Bhatia, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 332 days.

(21) Appl. No.: 18/637,169

(22) Filed: Apr. 16, 2024

(65) Prior Publication Data

US 2025/0324398 A1 Oct. 16, 2025

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/328* (2023.05); *H04W 72/0453* (2013.01); *H04W 72/541* (2023.01); *H04W 84/04* (2013.01)

(58) Field of Classification Search
None
See application file for complete search history.

(56) References Cited

U.S. PATENT DOCUMENTS

2010/0173587 A1* 7/2010 Gan ...................... H04W 16/14 455/62
2012/0270537 A1* 10/2012 Weng .................... H04W 48/16 455/424
(Continued)

OTHER PUBLICATIONS

3GPP, “Management and orchestration; 5G end to end Key Performance Indicators (KPI),” 3GPP TS 28.554, Dec. 1, 2023. 56 pages.
(Continued)

*Primary Examiner* — Steve R Young
(74) *Attorney, Agent, or Firm* — Amin, Turocy & Watson, LLP

(57) ABSTRACT

The technology described herein is directed towards intelligently determining citizens radio broadband system (CBRS) carrier bandwidth(s) based on the risk of granted spectrum being revoked by a Spectrum Access System (SAS). Interference and carrier bandwidth size also can be factors in selecting a carrier bandwidth. The technology described herein can be implemented in an O-RAN non-real time RAN intelligent controller rApp that has logic that selects the carrier bandwidth(s) intelligently. The logic can be based on threshold evaluations, and/or can be implemented via AI/ML. Based on a CBRS device's capabilities, the rApp selects the carrier bandwidth by prioritizing based on each candidate carrier bandwidth's size, risk of being revoked, and interference in the carrier's CBRS channel(s). For carrier aggregation, the rApp selects the bandwidths for the primary component carrier (PCC) and secondary component carrier (SCC) by accepting higher risk of revocation for the SCC relative to the PCC.

20 Claims, 21 Drawing Sheets

(51) Int. Cl.

| | |
|---|---|
| ***H04W 72/0453*** | (2023.01) |
| ***H04W 72/541*** | (2023.01) |
| ***H04W 84/04*** | (2009.01) |

(56) References Cited

U.S. PATENT DOCUMENTS

| | | | | |
|---|---|---|---|---|
| 2021/0136838 | A1* | 5/2021 | Khalid | H04W 36/26 |
| 2021/0266949 | A1* | 8/2021 | Sharma | H04W 16/14 |
| 2022/0417761 | A1* | 12/2022 | Khawer | H04W 16/14 |
| 2025/0301340 | A1* | 9/2025 | Dev | H04W 24/02 |
| 2025/0310849 | A1* | 10/2025 | Hashmi | H04W 52/0206 |
| 2025/0344217 | A1* | 11/2025 | Qin | H04W 8/24 |

OTHER PUBLICATIONS

"3rd Generation Partnership Project; Technical Specification Group Radio Access Network; NR; User Equipment (UE) radio transmission and reception; Part 1: Range 1 Standalone (Release 18)" 3GPP TS 38.101-1 V18.2.0, Jun. 2023, 847 pages.

* cited by examiner

RISK AND INTERFERENCE AWARE CITIZENS BROADBAND RADIO SERVICE CARRIER BANDWIDTH SELECTION

BACKGROUND

Citizens radio broadband service (CBRS) refers to the 150 MHz spectrum in the 3550 MHz-3700 MHz frequency range. Three different tiers of users can share this 150 MHz spectrum, namely incumbents (military and fixed satellites), priority access license users, which are operators that have purchased some of the CBRS spectrum in a Federal Communications Commission auction, and general authorized access users, who can operate for free in this unlicensed band as long as they do not interfere with the other two tiers.

In this system, radio equipment, referred to as a citizens broadband radio service device (CBSD), communicates via a base station with a centralized server called a spectrum access system (SAS) to request authorized channel usage (a "chunk" of the available CBRS spectrum) and power levels to operate in a deployment/geographical area. The CBRS band is thus governed by the spectrum access system (SAS) with respect to obtaining one or more chunks of spectrum based on such requests. When a CBRS system applies for spectrum, the CBRS system informs the SAS of the bandwidth for which it is applying, for each component carrier. SAS grants the spectrum for which a CBRS system applies if no incumbent or priority access license system is using that spectrum. SAS revokes the granted spectrum any time an incumbent or priority access license system wants to use such previously granted spectrum, because the incumbent and priority access license system have higher priority with respect to CBRS spectrum usage.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
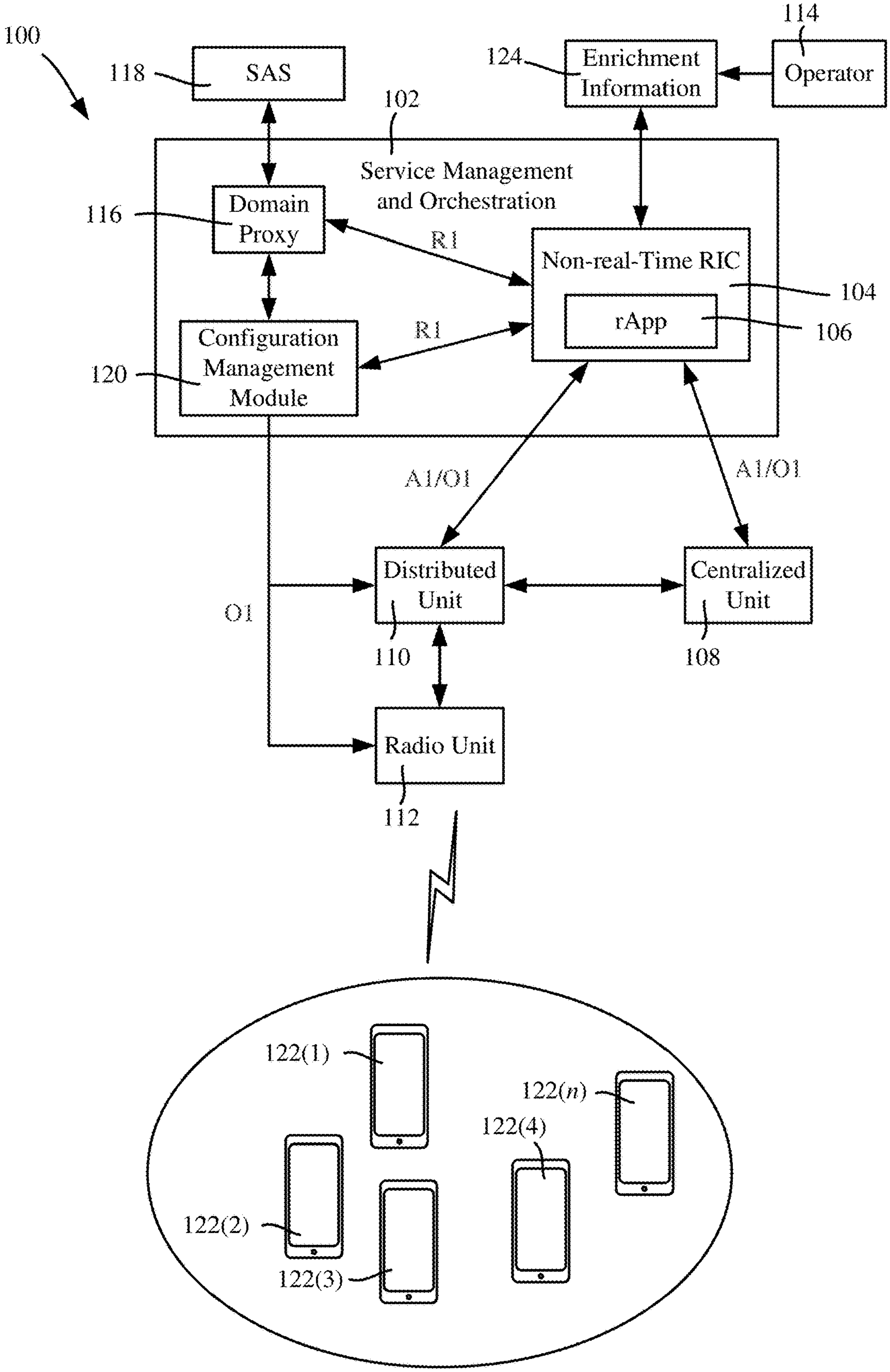
FIG. 1 is a block diagram representation of an example system in an open-radio access network (O-RAN) architecture in which a non-RT (non-real time) RAN intelligent controller application (rApp) in the non-real time RAN intelligent controller (RIC) operates to select CBRS spectrum, in accordance with various implementations and embodiments of the subject disclosure.

Various implementations and embodiments of the technology described herein are generally directed towards intelligently determining one or more citizens radio broadband system (CBRS) carrier bandwidths in a way that helps to optimize system performance in a CBRS deployment. To this end, in one implementation, the risk of granted spectrum being revoked by a Spectrum Access System (SAS) is considered before that spectrum is requested. Interference is also a factor in determining whether to request a particular chunk (one or more contiguous CBRS channels of 10 MHz each) of CBRS spectrum.

In general, with respect to risk there is a tradeoff of the carrier bandwidth for which a citizens radio broadband system with general authorized access applies versus the chance that the granted spectrum will be revoked. The larger the carrier bandwidth, the better the system throughput will be; however, the larger the carrier bandwidth that is requested and granted, the greater the risk that the channel grant will get revoked by the SAS, because there is a greater chance that an incumbent or priority access license system will want to use at least some of that granted spectrum later. As such, existing general authorized access CBRS systems use a static predetermined carrier bandwidth when applying for spectrum grants from SAS. The static bandwidth is decided by a vendor or operator offline. To avoid the risk that the channel gets revoked by SAS, a smaller bandwidth, like 20 MHz, is used. The decision of the carrier bandwidth in such a static CBRS system does not consider the actual available spectrum carrier bandwidths, interference, nor the risk of the carrier getting revoked in each CBRS deployment.

Described herein is a CBRS carrier bandwidth (BW) decision that is based on risk and interference awareness among candidate carrier bandwidths, as well as carrier bandwidth sizes. In one implementation, the technology described herein is implemented in an O-RAN (open radio access network) non-RT (non-real time) RAN intelligent controller application (rApp), which has the intelligent logic to determine and select the carrier bandwidth(s) for a CBRS system. The intelligent logic can be based on threshold evaluations, and/or can be implemented in a deep reinforcement learning agent.

The carrier bandwidth decision logic estimates the risk of each candidate carrier bandwidth (option) getting revoked by the SAS. The carrier bandwidth decision logic also collects an interference level on each chunk of the spectrum (a CBRS channel of 10 MHz each) based on the citizenship radio broadband device (CBSD) measurements and/or previous grants. Based on those data and each CBSD's capabilities (in terms of maximum number of component carriers and carrier bandwidth options supported), the rApp selects the carrier bandwidth. The carrier bandwidth is configured on the RAN nodes through the O1 interface via O-RAN-defined service management and orchestration (SMO).

If the CBSD supports carrier aggregation, the rApp selects the primary component carrier's bandwidth and secondary component carrier's (or carriers') bandwidths, which can have different risk tolerance levels. This is because revoking the primary component carrier causes service interruption, while the revoking the secondary component carrier impacts throughput, (without causing service interruption); therefore, higher risk can be accepted on secondary component carrier(s) than on the primary component carrier.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results.

The subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100, which in this example implementation is an O-RAN (open radio access network) compliant architecture. In FIG. 1, The proposed O-RAN compliant architecture includes a service management and orchestration (SMO) platform 102 that hosts a non-real time RAN intelligent controller 104. In turn, the non-real time RAN intelligent controller 104 is configured to host rApps, including an rApp 106 (a microservice) that implements the technology described herein for evaluation of CBRS carrier bandwidth candidates, and to generate the centralized unit (CU) 108/distributed unit (DU) 110 and radio unit (RU) 112 configurations according to operator-defined (block 114) policies.

In general and as will be understood, the rApp 106 sends carrier bandwidth and carrier location recommendations to a domain proxy (DP) 116 through the (O-RAN-defined) R1 interface. The domain proxy 116 is communicatively coupled to SAS 118 to receive available channels and grants from the SAS 118, as well as revocation information when revoking a grant. The rApp 106 uses the R1 interface to the domain proxy 116 to receive information on whether or not the recommended carrier bandwidth is granted by SAS 118, as well as if and when the carrier is revoked by SAS.

Based on the carrier(s) granted by the SAS 118, the rApp 106 generates the centralized unit 108/distributed unit 110 and radio unit 112 configurations, and sends the generated configurations to a configuration management (CM) module 120. The rApp 106 also uses the O1 interface to collect KPI (key performance indicator) measurements from the centralized unit 108/distributed unit 110 and radio unit 112, including data for one or more UEs 122(1)-122 (*n*), (which are capable of operating as citizens broadband radio service devices), such as interference information in the form of received signal strength indicator (RSSI) statistical values, throughput, delay, packet loss and the like.

The radio unit 112 provides wireless services to the UEs 122(1)-122 (*n*). In general, the radio unit 112 acts as a citizens broadband radio service device (CBSD), which applies the domain proxy-configured carrier communicated over the O1 interface through the configuration management module 120. Note that the rApp 106 knows, via the operator 114, enrichment information 124, including capability data of the citizens broadband radio service device(s), such as the maximum number of component carriers and the carrier bandwidth data.

Figure 2:
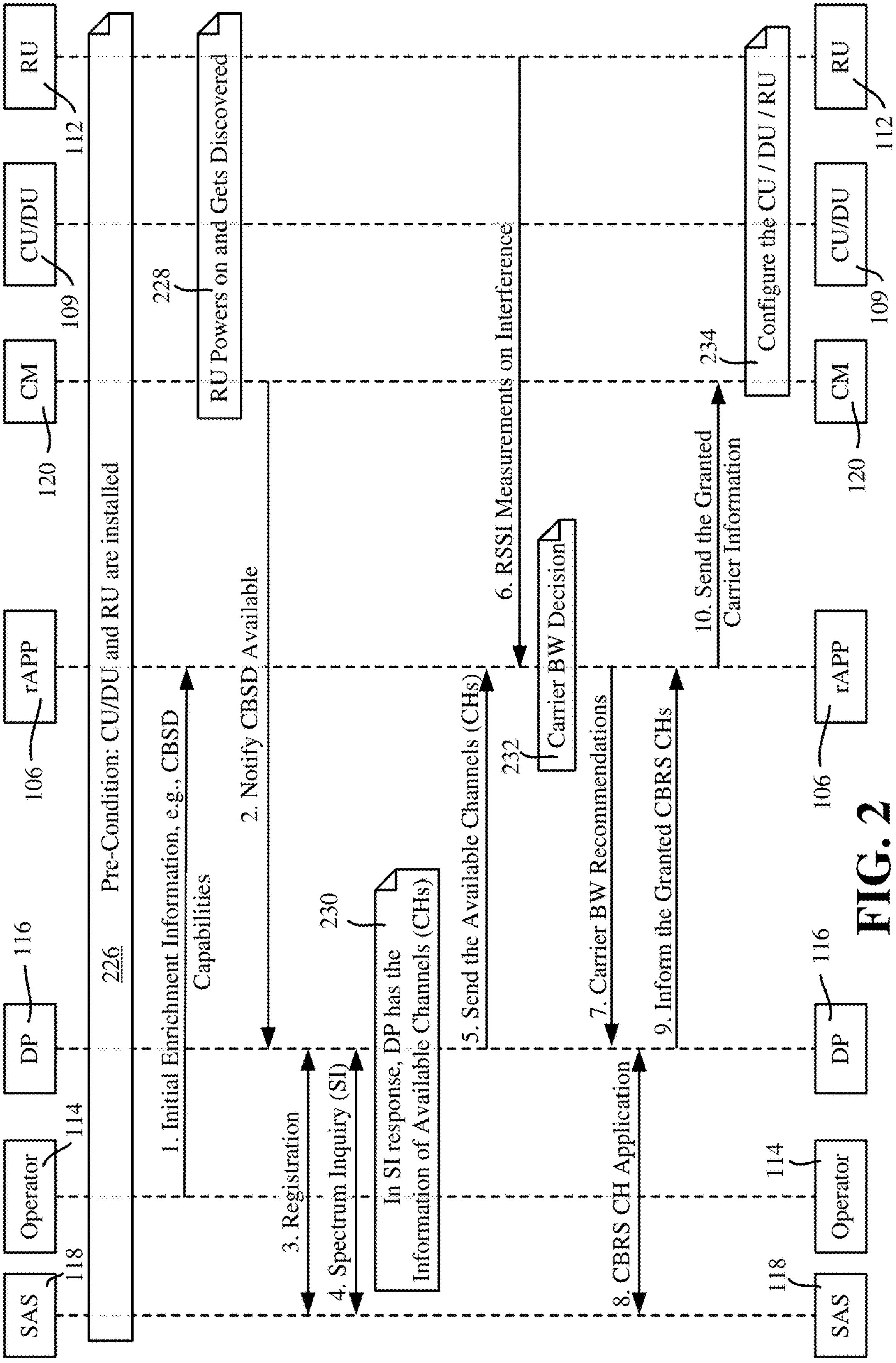
FIG. 2 is a sequence/signaling diagram representation of dataflow corresponding to various entities in the example system of FIG. 1, in accordance with various implementations and embodiments of the subject disclosure.

As depicted in the example sequence/signaling/dataflow diagram of FIG. 2, after the CU/DU (collectively labeled 109) and the radio unit (RU) 112 are installed (block 226), the operator 114 provides the rApp with initial enrichment information, including the CBSD capability data (arrow one (1)). When the RU 112 powers on and gets discovered (block 228), the configuration management (CM) module 120 notifies the domain proxy (DP) 116 that a CBSD is available (arrow two (2)).

In turn, the domain proxy (DP) 116 performs registration (arrow three (3)) with the SAS 118, and inquires about spectrum availability (arrow four (4)), whereby the SAS 118 responds (also arrow four (4)) to the domain proxy (DP) 116 with a response (block 230) that includes information of the available CBRS channels. The domain proxy 116 sends the available CBRS channel information to the rApp 106 (arrow five (5)), which also collects the received signal strength indicator (RSSI) measurements from the radio unit 112, to be used is used for interference evaluations per 10 MHz channel.

Based on the available channels and the interference levels, the rApp 106 makes a carrier bandwidth (BW) decision (block 232) as to which grant to request for which component carrier. As described herein, the bandwidth decision is based on historical risk of the grant being revoked as well as the interference data. Once decided, the rApp 106 sends these as carrier bandwidth recommendations (arrow seven (7)) to the domain proxy 116, which applies for the appropriate CBRS channels (arrow eight (8)) to be granted by the SAS 118.

In the example of FIG. 2 (at least some of) the requested channels are granted by the SAS 118 in response to the request from the domain proxy 116, whereby the domain proxy 116 informs the rApp 106 of the granted CBRS channels (arrow nine (9)). In turn, the rApp 106 sends the granted carrier information to the configuration management (CM) module 120, which then appropriately configures the CU/DU 109 and the RU 112 (block 234).

Figure 3:
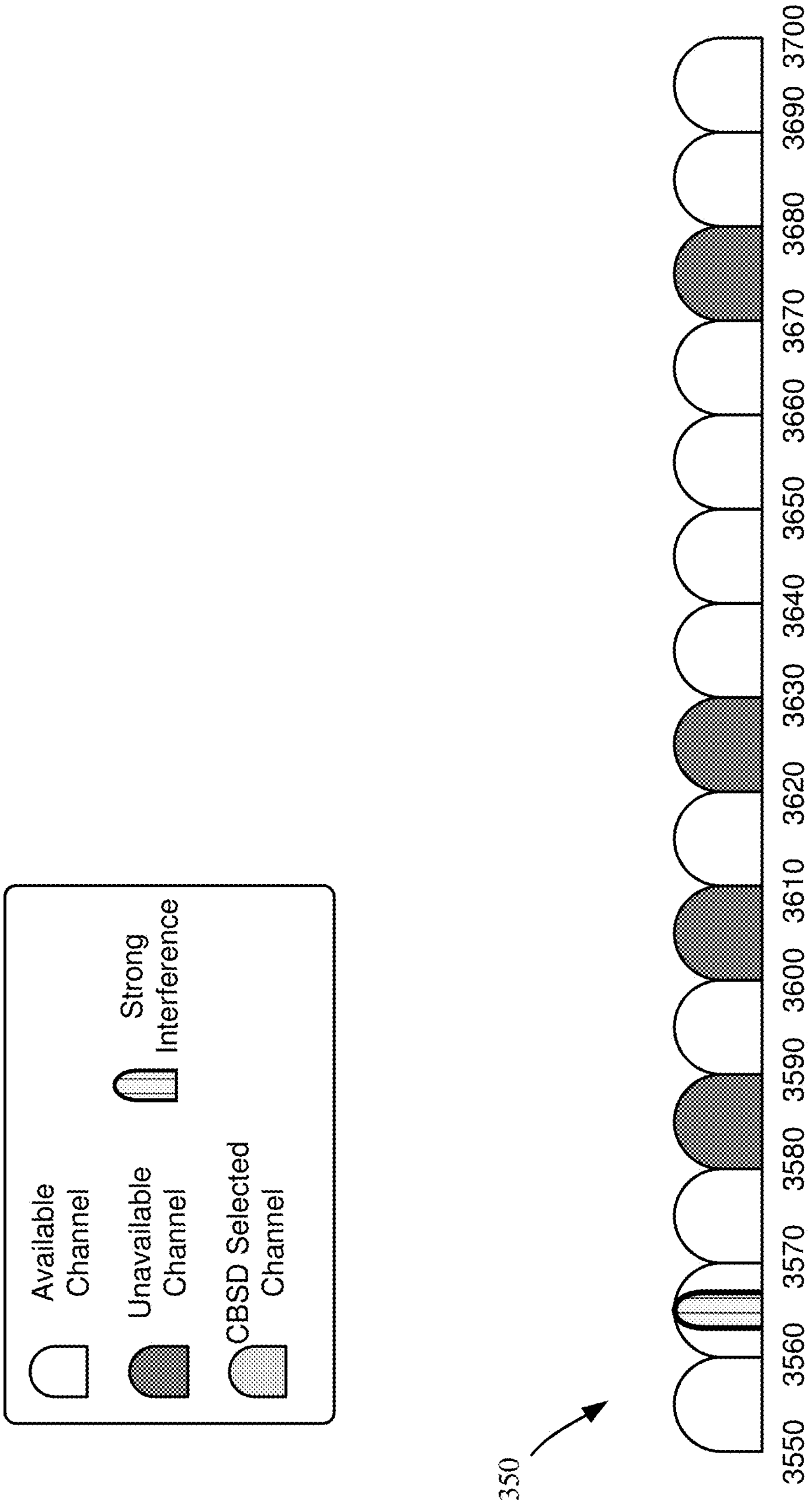
FIGS. 3-6 are representations of example channels in the CBRS spectrum, showing availability and various types of carrier bandwidth selection, in accordance with various implementations and embodiments of the subject disclosure.

FIG. 3 is a representation 350 of an available (unshaded) and unavailable (dark shaded) CBSD spectrum example. As can be seen in this example, along with two available single 10 MHz channels (3590-3600 MHz and 3610-3620 MHz), there are three available contiguous channels (3550-3580 MHz), four available contiguous channels (3630-3670 MHz), and two available contiguous channels (3680-3700 MHZ). Thus, candidate carrier bandwidths, from largest available to smallest, are 40 MHz, 30 MHz, 20 MHz and 10 MHz; as will be understood, the 40 MHz, 30 MHz, 20 MHz can be used as is, and/or can be divided into smaller carrier bandwidths. There is strong interference in the channel 3560-3570 MHz.

Consider an example of CBSD capability data of a maximum of two component carriers, and carrier bandwidth capability of 10 MHz, 20 MHz, 30 MHz, 40 MHz, 60 MHz, 80 MHz and 100 MHz; (note that the technology described herein is not limited to devices with a maximum of two component carriers). As shown in the upper portion representation 448 of FIG. 4, without the technology described herein the existing static solution is to select two fixed carrier bandwidths (e.g., 20 MHz each, shown as lightly shaded), one for the primary component carrier PCC, and another one for the secondary component carrier SCC. This fixed carrier bandwidth solution does not consider achieving better performance based on the available spectrum and/or the CBSD's capability data.

Figure 4:
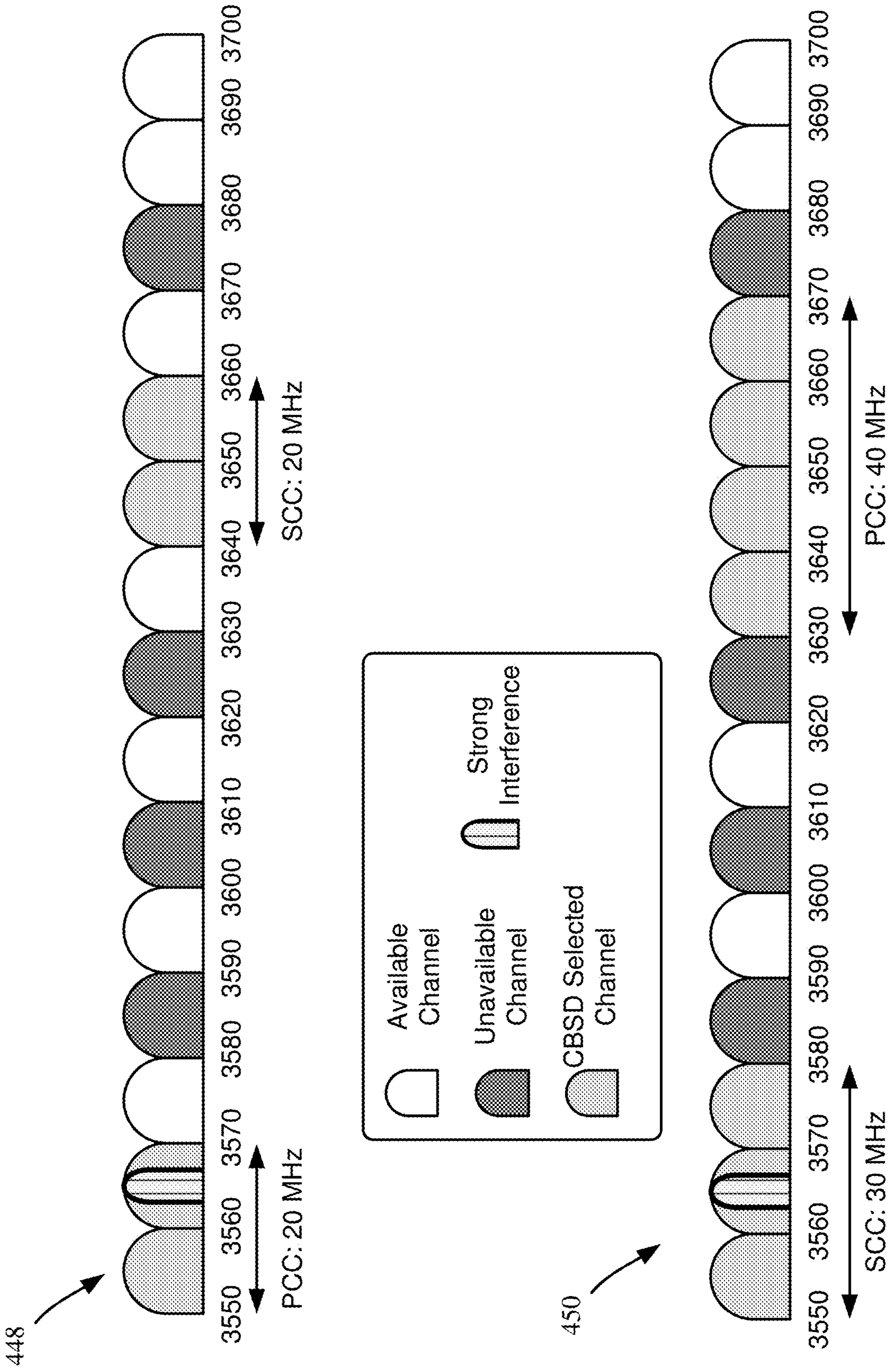

In contrast, the lower portion representation 450 of FIG. 4 represents one example implementation that, for the same CBSD device/device capability data, is able to select (depicted as lightly-shaded for selected CBSD channels) the largest available channel bandwidth of 40 MHz for the primary component carrier and the next-largest available channel bandwidth of 30 MHz for the secondary component carrier. While this is generally advantageous over the prior solution, selecting the largest and next largest available component carriers does not consider the risk of the grants being revoked.

Figure 5:
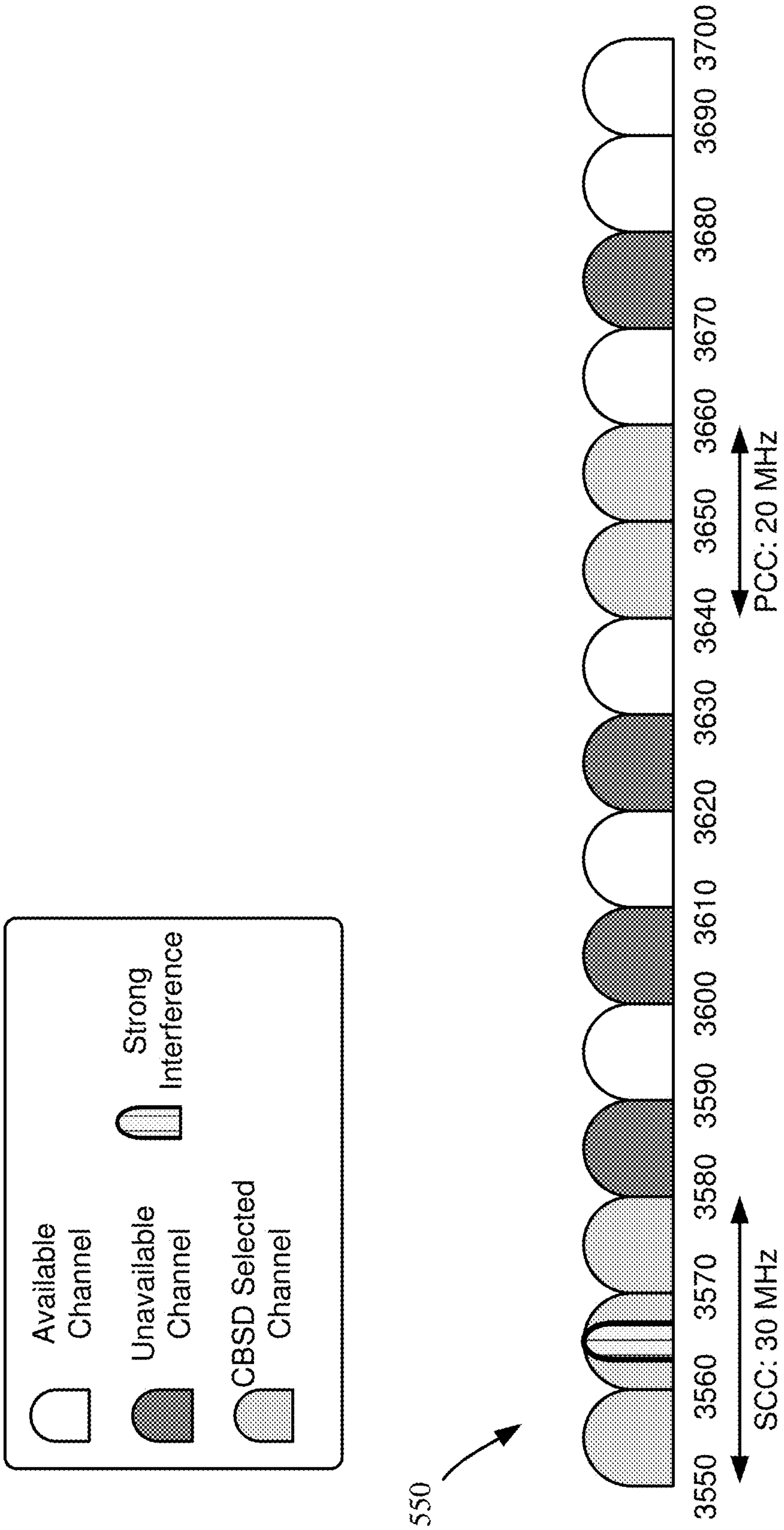

As described herein, the example of FIG. 5 is similar to the example of FIG. 4 in that the largest available carrier bandwidths are considered, but unlike FIG. 4, the implementation example in FIG. 5 also considers the risk of a grant being revoked. Thus, as can be seen in the representation 550 of FIG. 5, prior historical/statistical information used by the rApp 106 (FIGS. 1 and 2) determines that the risk for the 40 MHz carrier bandwidth is too high in this example, whereby the rApp only selects carrier bandwidths of 30 MHz or lower. Further, because the larger the carrier bandwidth, the greater the risk, in this example the rApp decides that the primary component carrier is to use a smaller, lower risk (20 MHz) carrier bandwidth compared to the secondary component carrier (30 MHz); in general, higher risk can be acceptable for the secondary component carrier, as having the secondary component carrier bandwidth revoked is less significant than having the primary component carrier revoked, which causes service interruption.

Figure 6:
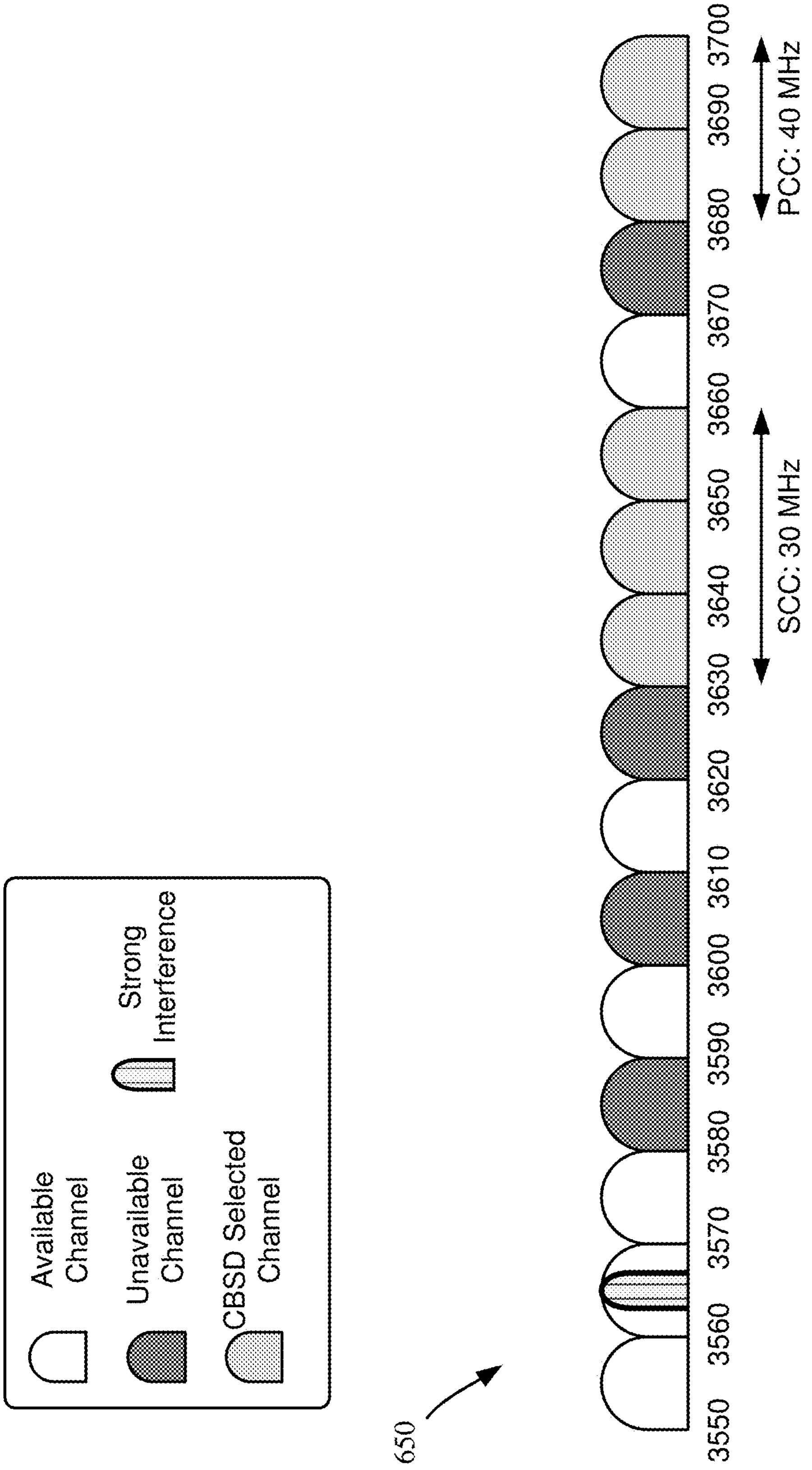
Figure 7:
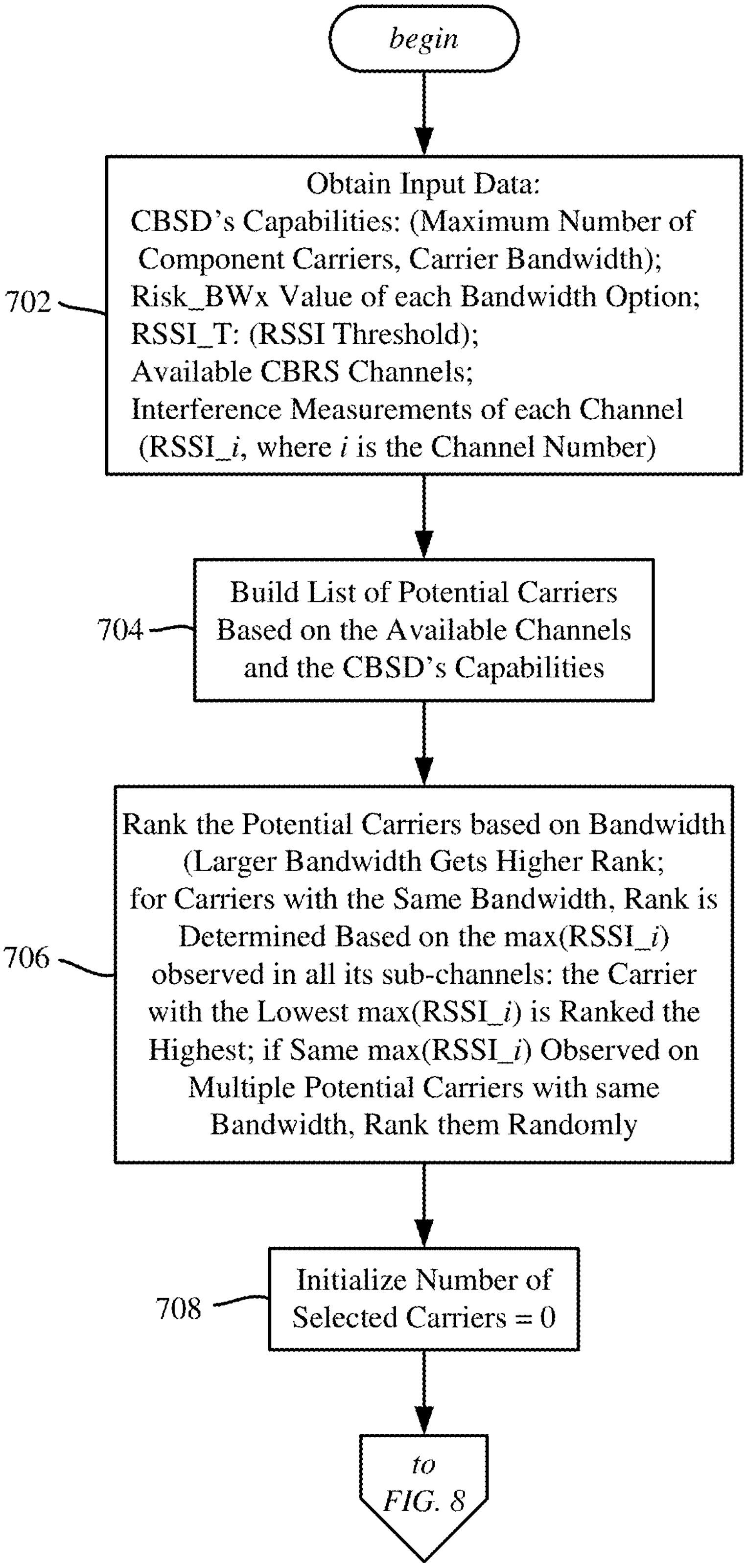
FIGS. 7-10 comprise a flow diagram showing example operations related to threshold-based selection of carrier bandwidths among potential carrier bandwidth candidates, in accordance with various implementations and embodiments of the subject disclosure.

Yet another example implementation is described with reference to the example representation 650 of FIG. 6, in which along with potential carrier bandwidth sizes, both risk and interference are considered in deciding which channels to select for which of the two component carriers. As can be seen, rather than use the 30 MHz carrier bandwidth from 3550 MHz-3580 MHz channels, which has sufficiently strong interference (which can be based on a threshold evaluation as described herein) detected in the 3560 MHZ-3570 MHz channel, the rApp logic instead opts for the primary component carrier to use the 20 MHz carrier bandwidth of the 3680 MHz-3700 MHz channels, and the 30 MHz carrier bandwidth of the 3630 MHZ-3660 MHz channels for the secondary component carrier. As can be seen, with both risk and interference aware CBRS carrier bandwidth selection logic, more optimized carriers and carrier bandwidth are selected for the CBSD, which provides better optimized throughput (20 MHz+30 MHz) compared to fixed solutions (20 MHz+20 MHz, in the upper portion of FIG. 4), yet does so with consideration of tolerable risk of the carrier bandwidth being revoked and avoidance of carrier bandwidth with channel(s) that have high interference.

FIGS. 7-10 show example operations of example of risk and interference aware CBRS carrier bandwidth selection logic, e.g., of the rApp 106 (FIGS. 1 and 2), beginning at operation 702 where various input is obtained. The example input includes the CBSD's capability data (maximum number of component carriers and carrier bandwidth), a Risk_BWx value of each bandwidth option (carrier bandwidth candidate, where BWx=10, 20, 30, . . . . MHz), interference threshold data $RSSI\_T_m$, or (RSSI threshold), the available CBRS channels, and the interference measurements of each channel (RSSI_i, where i is the channel number). The table below shows an example of the Risk_BW values (representing the risk of revoking per carrier bandwidth):

| BW (MHz) | 10 | 20 | 30 | 40 | 50 | 60 | 70 | 80 | 90 | 100 |
|---|---|---|---|---|---|---|---|---|---|---|
| Risk_BW (%) | 1 | 2 | 3 | 5 | 6 | 6.4 | 7.1 | 7.5 | 9.5 | 9.8 |

Note that Risk_BW is defined as the risk of a bandwidth option getting revoked in a defined time period, e.g., (one day/24 hours), which can be in percentages as in the above example, ranging from 0 (lowest risk) to 100 (highest risk). Further, note that the Risk_BW values in the above tables are only examples; in implementations, the rApp updates the estimated values based on real time data collected in each deployment (described herein with reference to FIG. 11). As can be seen, the larger the bandwidth, the greater the risk of that bandwidth being revoked once granted.

Operation 704 represents building a list of potential carriers based on the available channels and the CBSD's capabilities. In this example, corresponding to the example previously described with reference to FIG. 3, the candidate potential carriers list is:

40 MHz: 3630-3670;

30 MHz: 3550-3580, 3630-3660, 3640-3670;

20 MHz: 3550-3570, 3560-3580, 3630-3650, 3640-3660, 3650-3670, 3680-3700;

10 MHz: 3550-3560, 3560-3570, . . . (any unshaded potential carrier in FIG. 3).

Operation 706 represents ranking the potential carriers based on carrier bandwidth (larger bandwidth gets higher rank). For a subgroup of carriers with the same bandwidth, (e.g., the three 30 MHz candidates, 3550-3580, 3630-3660, 3640-3670), rank is determined based on the max (RSSI_i) observed in each of a carrier bandwidth's sub-channels (where i is the channel number and i=0, . . . , 14, that is, $CH_0$ is the 3.55-3.56 GHz channel, $CH_1$ is the 3.56-3.57 GHz channel and so on. The carrier with the lowest max (RSSI_i) is ranked the highest in that subgroup, and if the same max (RSSI_i) is observed on multiple potential carriers in same bandwidth subgroup, those having the same max (RSSI_i) are ranked randomly.

Operation 708 initializes the number of selected carriers for the CBSD to zero; this number will be incremented as carriers are selected as described with reference to FIGS. 8-10, up to the CBSD's maximum number of component carriers (obtained as input at operation 702). The process continues to FIG. 8, operation 802.

Operation 802 represents choosing the potential carrier with the highest rank from the ordered (via operation 706) potential carriers list. Operation 804 evaluates whether the risk associated with this potential carrier is below a determined risk tolerance threshold value (obtained as described with reference to FIGS. 12 and 13). If not, this potential carrier is moved (actually moved or virtually moved such as by flagging as high risk) to a high risk carrier list at operation 806, and the process is repeated as needed via operation 818 (until no potential carriers remain in the potential carriers list). Otherwise, if sufficiently low risk, operation 804 branches to operation 808 to evaluate the interference.

Operation 808 determines whether there are one or more channels in the potential carrier with a low received signal strength below a defined threshold, representative of interference, that is, whether RSSI_i<RSSI_T for each subchannel in the potential carrier. If so, that potential carrier is moved to a high interference list at operation 810, and the process is repeated as needed via operation 818 (until no potential carriers remain in the potential carriers list).

If neither risk nor interference was an issue as evaluated at operations 804 and 808, respectively, operation 812 selects the potential carrier for use, e.g., moves the potential carrier to a selected carrier list. Operation 814 increments the number of selected carriers; then, if the number of selected carriers equals the device's maximum component carrier capability, the process ends. Otherwise operation 818 repeats the process, looking for low risk, low interference carriers to select, until none remain.

Figure 9:
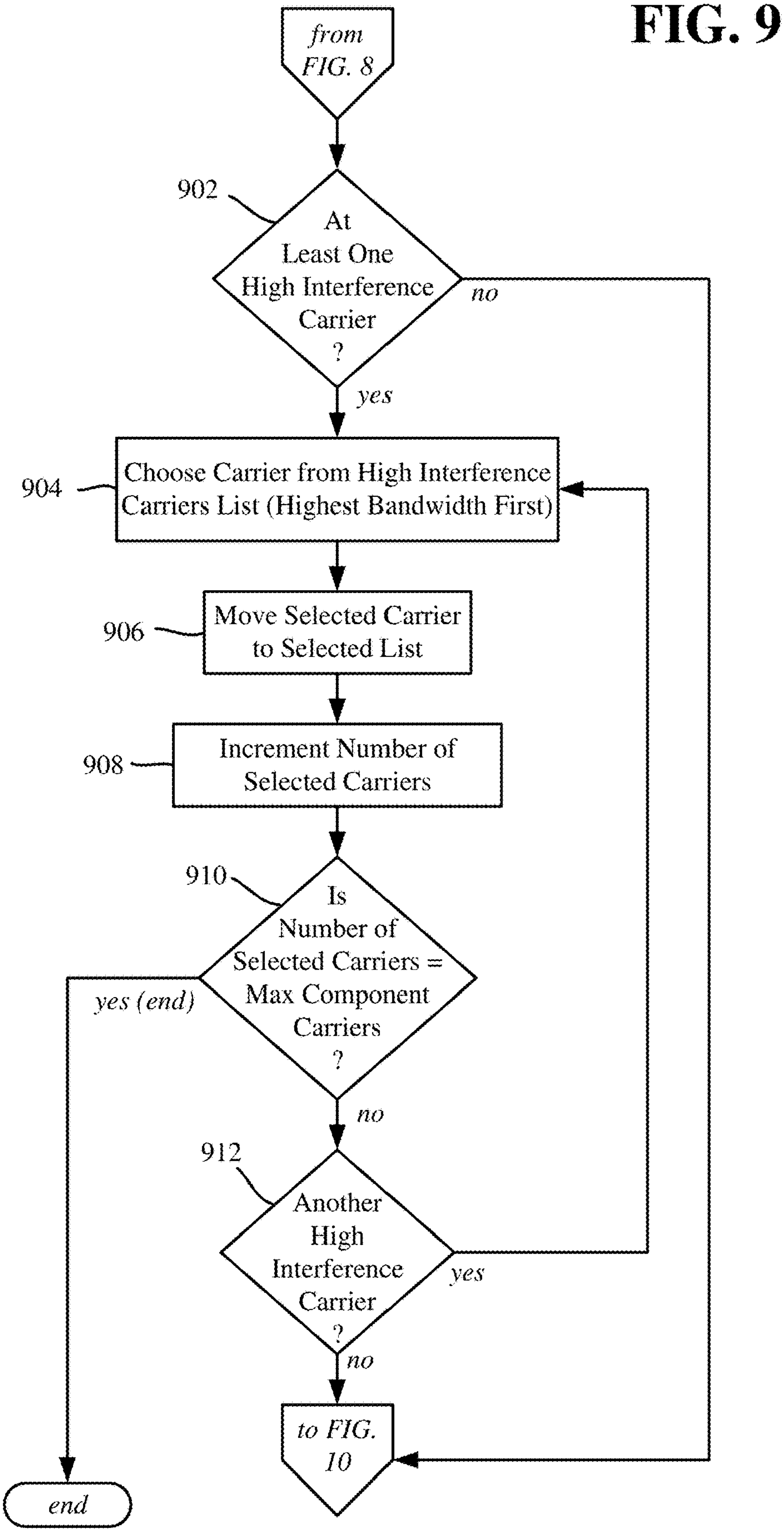
Figure 10:
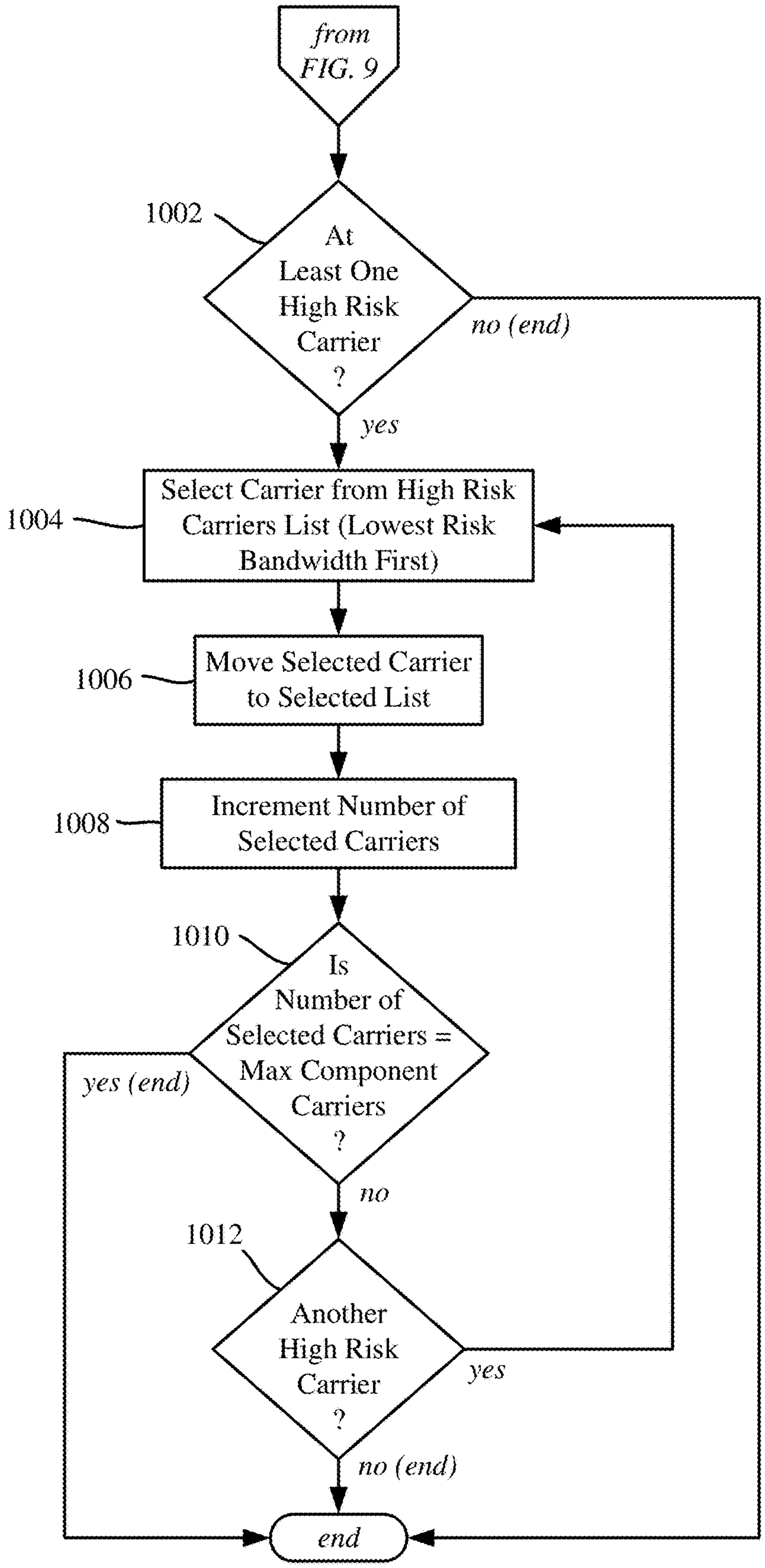

If no potential carriers remain on the list, as evaluated by operation 818, then there have not been enough carriers selected, and the process continues to FIG. 9, to select carrier(s) from the high interference list, if the list contains at least one carrier (operation 902). For a high interference carrier in the high interference list, operations 904 and 906 select that carrier, and operation 908 increments the selected carriers count. Note that the carrier with the largest bandwidth is selected first (e.g., from being added first by operation 810 starting at the top of the high interference list).

After each high interference carrier is selected and the selected carrier count incremented (operation 908), if the number of selected carriers has reached the device's maximum component carrier capability, operation 910 ends the process. Otherwise operation 912 repeats the process until either the device's maximum component carrier capability is reached, or no high interference carriers remain. If none remain, operation 912 branches to operation 1002 of FIG. 10 to start selecting high risk carriers.

Operation 1002 ends the process if the high risk list is empty; this means that there were not enough carriers available relative to the maximum number of component carriers for the device. For each high risk carrier in the list (lowest Risk_BW first, which can be sorted or selected in that order), operations 1004 and 1006 select that carrier, and operation 1008 increments the selected carriers count. If the number of selected carriers has reached the device's maximum component carrier capability, operation 1010 ends the process. Otherwise operation 1012 repeats the process until either the device's maximum component carrier capability is reached, or no high risk carriers remain, again indicating that not enough carriers were available relative to the maximum number of component carriers for the device.

To summarize thus far, the example risk and interference aware CBRS carrier bandwidth selection logic of FIGS. 7-10 groups available CBRS channels into potential carriers, i.e., candidates, based on the CBSD's capabilities. The potential carriers are ranked based on the bandwidth, after which the carrier selection is conducted based on the risk that a carrier gets revoked per its bandwidth, i.e., Risk_BWx), and the interference of its one or more 10 MHz sub-channels (RSSI_i, where i is the channel number).

Figure 8:
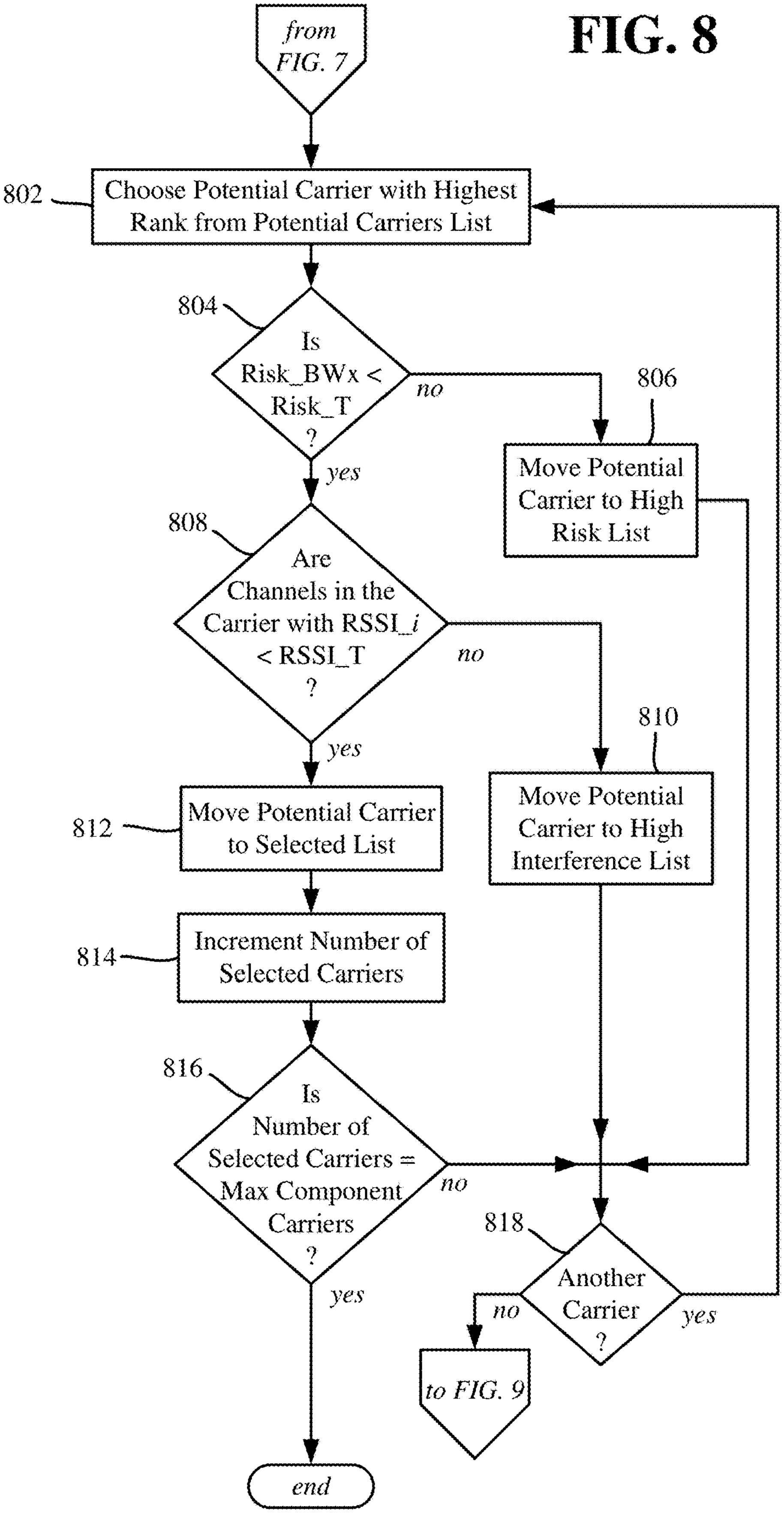

Note that the example in FIG. 8 uses the same Risk_T (Risk threshold) for the primary component carrier the secondary component carrier(s). The logic can be extended to use a different risk threshold value for the primary component carrier compared to another risk threshold value for the secondary component carriers, such as by defining a Risk_T_PCC and Risk_T_SCC, where Risk_T_PCC is expected to be lower than Risk_T_SCC, because the primary component carrier tolerates less risk of getting revoked. In general, the same process logic in FIGS. 7-10 can be used for carrier selection in this dual risk threshold case.

Figure 11:
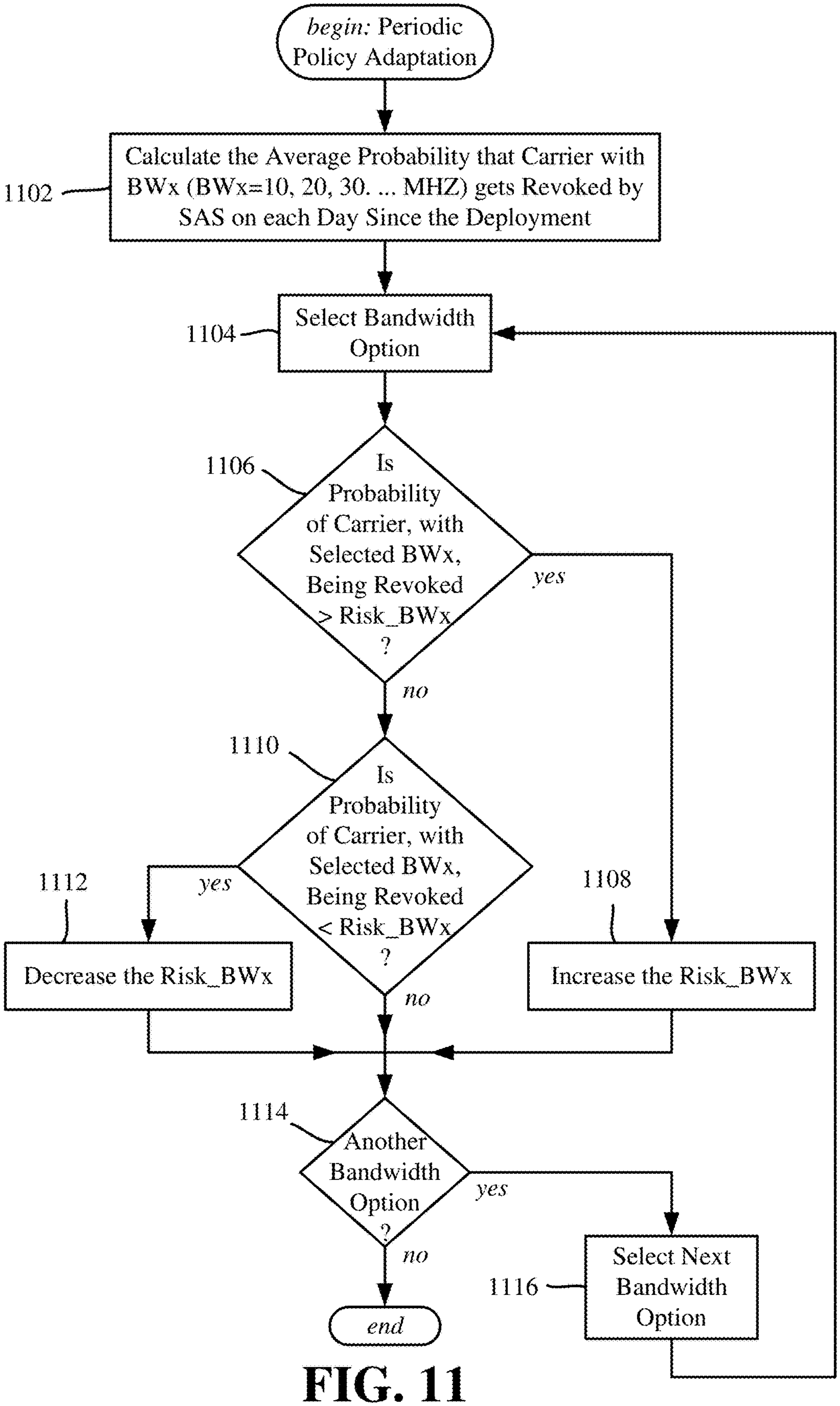
FIG. 11 is a flow diagram showing example operations related to determining risk values for carrier bandwidth candidate options, in accordance with various implementations and embodiments of the subject disclosure.

Turning to determining and fine tuning the risk, Risk_BWx, FIG. 11 represents the real time adaptation of Risk_BWx (the risk of revoking per each bandwidth option) based on the observed probability that a carrier of a specific bandwidth gets revoked. In this example, operation 1102 determines a probability value (e.g., the average probability) that a carrier with bandwidth BWx (BWx=10, 20, 30 . . . MHz) gets revoked by SAS, e.g., on each day since the deployment. Operation 1104 selects a carrier bandwidth option, and operation 1106 evaluates whether the probability of the carrier with bandwidth BWx being revoked is greater than the Risk_BWx value. If so operation 1108 increases the Risk_BWx value. Similarly, operations 1110 and 1112 decrease the Risk_BWx value if the probability of being revoked is less than the Risk_BWx value. Operations 1114 and 1116 repeat the process for each bandwidth option.

Figure 12:
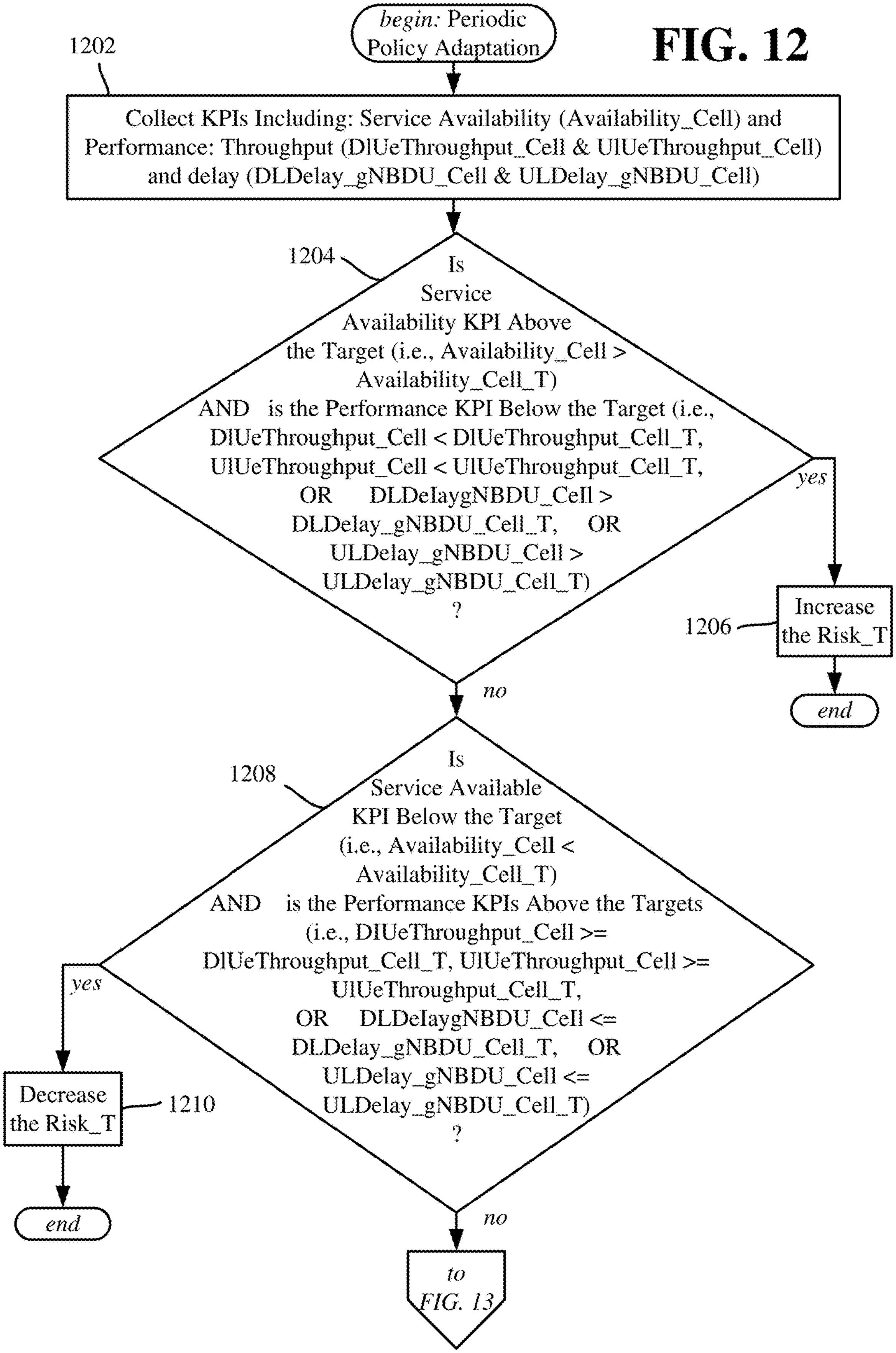
FIGS. 12 and 13 comprise a flow diagram showing example operations related to determining a risk threshold value for use with respect to the operations of FIGS. 7-10, in accordance with various implementations and embodiments of the subject disclosure.
Figure 13:
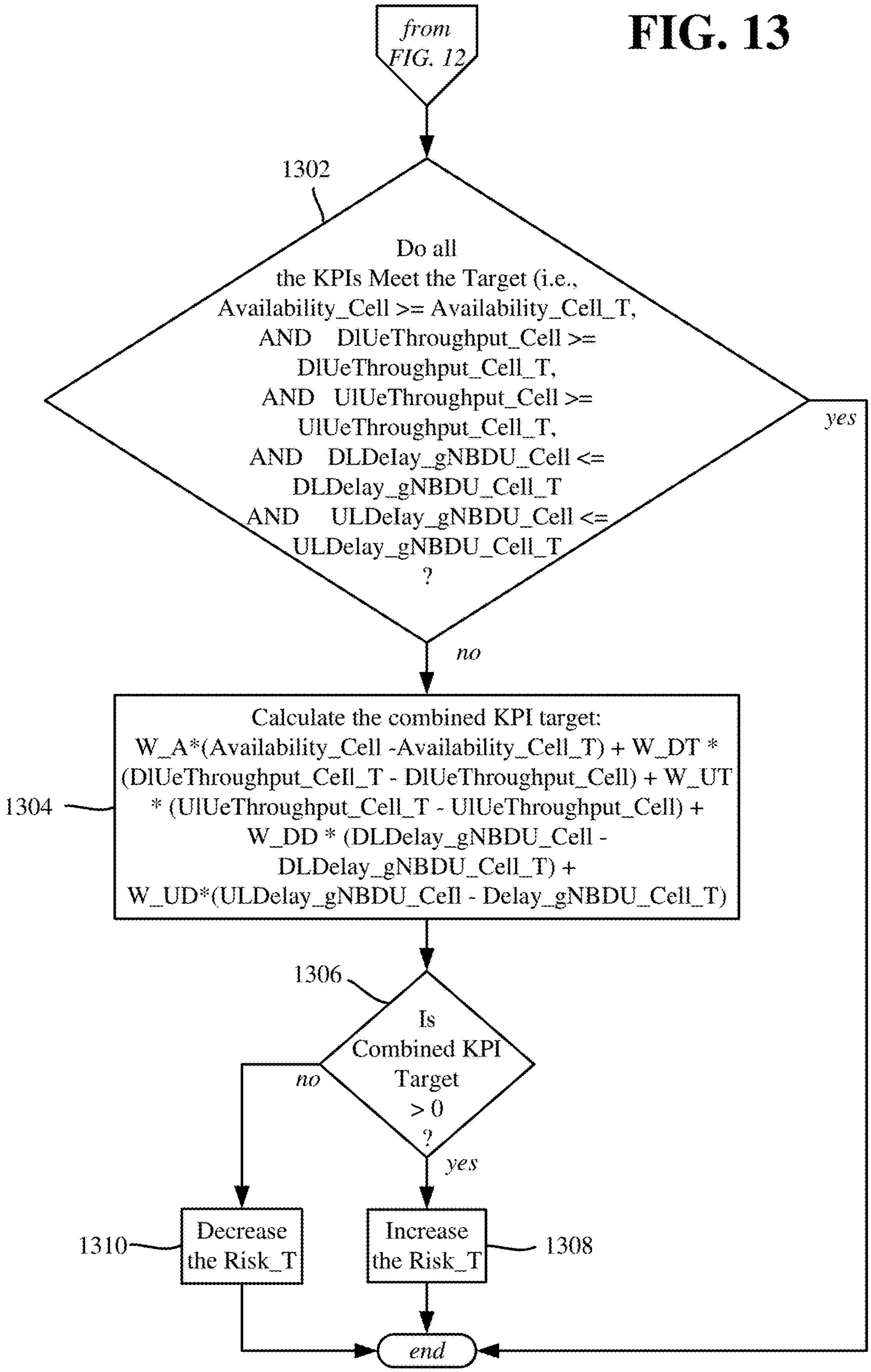

FIGS. 12 and 13 represent risk threshold policy fine tuning, that is, the real time adaptation of the risk threshold (Risk_T) based on (at least) the measured service availability KPI, performance KPIs (throughput, delay), and target requirements, as collected at operation 1202. In general, the KPIs can be defined as:

Cell availability KPI: Availability__Cell=(Target__Service__Time − Down__Time) / Target__Service__Time. The Cell availability KPI is defined as the total target service time (Target__Service__Time) of a cell minus the total down time of the cell due to the carrier -continued

| |
|---|
| being revoked by SAS (Down_Time) and divided by the Target_Service_Time. It reflects the percentage of the time that the cell's service is not interrupted due to the carrier getting revoked. |
| Performance KPIs (e.g., 3GPP TS 28.554, Management and orchestration; 5G end to end Key Performance Indicators (KPI)) include throughput and delay: |
| Throughput: |
| DlUeThroughput _Cell: average downlink RAN UE throughput for a cell. |
| UlUeThroughput_Cell: average uplink RAN UE throughput for a cell. |
| Delay: |
| DLDelay_gNBDU_Cell: average downlink packet transmission delay through the gNB-DU part to the UE. |
| ULDelay_gNBDU_Cell: average packet transmission delay through the gNB-DU part from the UE in a NR cell. |

Figure 14:
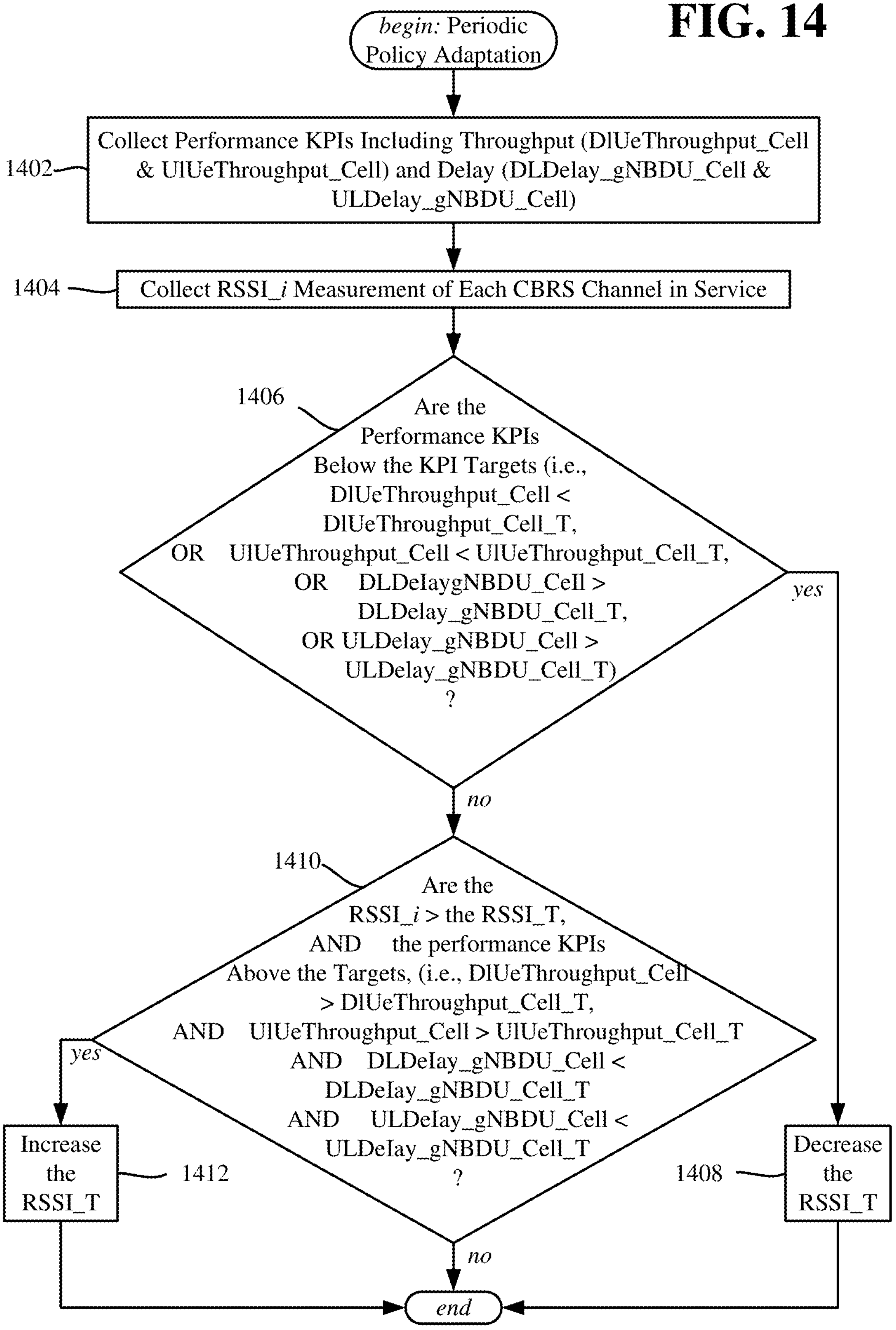
FIG. 14 is a flow diagram showing example operations related to determining an interference-related threshold value for use with respect to the operations of FIGS. 7-10, in accordance with various implementations and embodiments of the subject disclosure.

The KPI thresholds in FIGS. 12-14 (i.e., Availability_Cell_T, DlUeThroughput_Cell_T, UlUeThroughput_Cell_T, DLDelay_gNBDU_Cell_T, ULDelay_gNBDU_Cell_T) and the weights (W_A, W_DT, W_UT, W_DD, W_UD) are input the by operator and can be configurable.

As can be seen, at operations 1204 and 1208 these various KPI values are compared against operator-defined threshold values for service availability cell (Availability_Cell_T), downlink and uplink throughput performance threshold values (DlUeThroughput_Cell_T and UlUeThroughput_Cell_T, respectively) and downlink and uplink delay thresholds (DLDelay_gNBDU_Cell_T and ULDelay_gNBDU_Cell_T, respectively). Depending on the results of the evaluation at operation 1204, the risk threshold (Risk_T) may be increased (operation 1206), and the results of the evaluation at operation 1208, the risk threshold (Risk_T) may be decreased (operation 1210). If neither increased at operation 1206 nor decreased at operation 1210, the process continues to operation 1302 of FIG. 13 for further evaluation.

Operation 1302 ends the risk threshold (Risk_T) adaptation if the KPIs meet the target, based on threshold evaluations. If they do not, operation 1304 calculates a combined KPI target value, which if positive, as evaluated at operation 1306, results in the risk threshold (Risk_T) being increased (operation 1308), or if negative results in the risk threshold (Risk_T) being decreased (operation 1310).

FIG. 14 is directed to RSSI threshold policy fine tuning, which represents the real time adaptation of the RSSI_T (RSSI threshold) based on the measured KPIs and the target requirements (throughput, delay). In general, the interference/received signal strength indicator threshold (RSSI_T) is not statically configured, but instead can be dynamically adjusted based on actual field data input, which helps reduce false positive interference determinations. Operation 1402 collects the throughput and delay performance KPIs, and operation 1404 collects the RSSI_i measurement of each CBRS channel in service. If the performance KPIs are below the targets at operation 1406, operation 1408 decreases the RSSI threshold (RSSI_T) and the process ends. If the RSSI_i is greater than the RSSI threshold (RSSI_T), and the performance KPIs are above the targets at operation 1410, operation 1412 increases the RSSI threshold (RSSI_T) and the process ends.

Instead of or in addition to the threshold-based decision making as described with reference to FIGS. 7-10, an alternative embodiment uses an artificial intelligence/machine learning engine with a deep reinforcement learning (DRL) model, e.g., within the rApp 106 implementation in FIGS. 1 and 2. In one example implementation generally represented in FIG. 15, deep reinforcement learning-based CBRS carrier bandwidth selection via the DRL model/agent 1560 operates to maximize a utility function, which is dependent upon multiple factors as described herein.

Among the factors, the model, (as described herein via a long short term memory (LSTM, a type of recurrent neural network) and/or another type of recurrent neural network (RNN) 1564), is based on historical information 1562 related to the past use of the CBRS spectrum in the same deployment/geographical area to generate the carrier bandwidth selection (the output action 1564). The past historical information 1562 can include the granting and revoking status and time for each carrier bandwidth, and the interference of each spectrum chunk. The historical data 1562 is used to train the model so that relevant carrier bandwidth selection can be done for each deployment. The history repository (in block 1562) stores past CBRS requests, grant decisions, revocation statuses and agents' strategies which can be characterized and given as input to the deep reinforcement learning agent in order to facilitate its decision making. In addition, the duration of the past grants is used for reward shaping, as grants with longer grant duration are favored over those which are revoked quickly.

Thus, the multiple factors can include, but are not limited to, whether the carrier grant based on the rApp recommendation is accepted by the Spectrum Access System, the impact of the CBRS bandwidth grant on user level KPIs, (e.g. throughput, delay, interference), efficient bandwidth utilization from the available spectrum, and revoking of the CBRS grant in a future time instance, along with the time interval after which the grant is revoked.

In mathematical terms, the utility function may be expressed by:

$$U(t) = \frac{1}{BW_{free} + \delta}\left\{\alpha_1(Gr_t) + \alpha_2(\Delta KPI) - \alpha_3\left(\frac{T_m - T}{T_m}\right)\right\};\ \alpha_1 > \alpha_2, \alpha_3$$

where

U(t)—Utility function to be maximized by the RL agent, $Gr_t$—CBRS carrier grant decision, which is +1 for accept and −1 for reject, ΔKPI—% change in KPI values, % change to take a positive value if cell throughput is increased or incase latency is the KPI, then positive value if latency is decreased; and vice versa, $T_m$—Maximum Duration for a CBRS grant—an operator-controlled variable depicting the amount of time (in seconds, or decision epochs) for which a CBRS request is intended, T—The time duration of a CBRS grant after which it is revoked by the Spectrum Access System. This component of the utility is received in the future and is stored in the repository so that the DRL agent 1560 keeps the CBRS grant duration record under consideration while making new grant requests.

$BW_{free}$—% available bandwidth after the grant request. This component of the utility represents the bandwidth efficiency; the agent ideally wants to minimize the unutilized spectrum.

δ—A constant with value close to zero to avoid the utility function going to infinite if BW free is zero.

$\alpha_1$, $\alpha_2$, $\alpha_3$—Weightage parameters where the grant request decision is given a higher priority than the rest.

Figure 15:
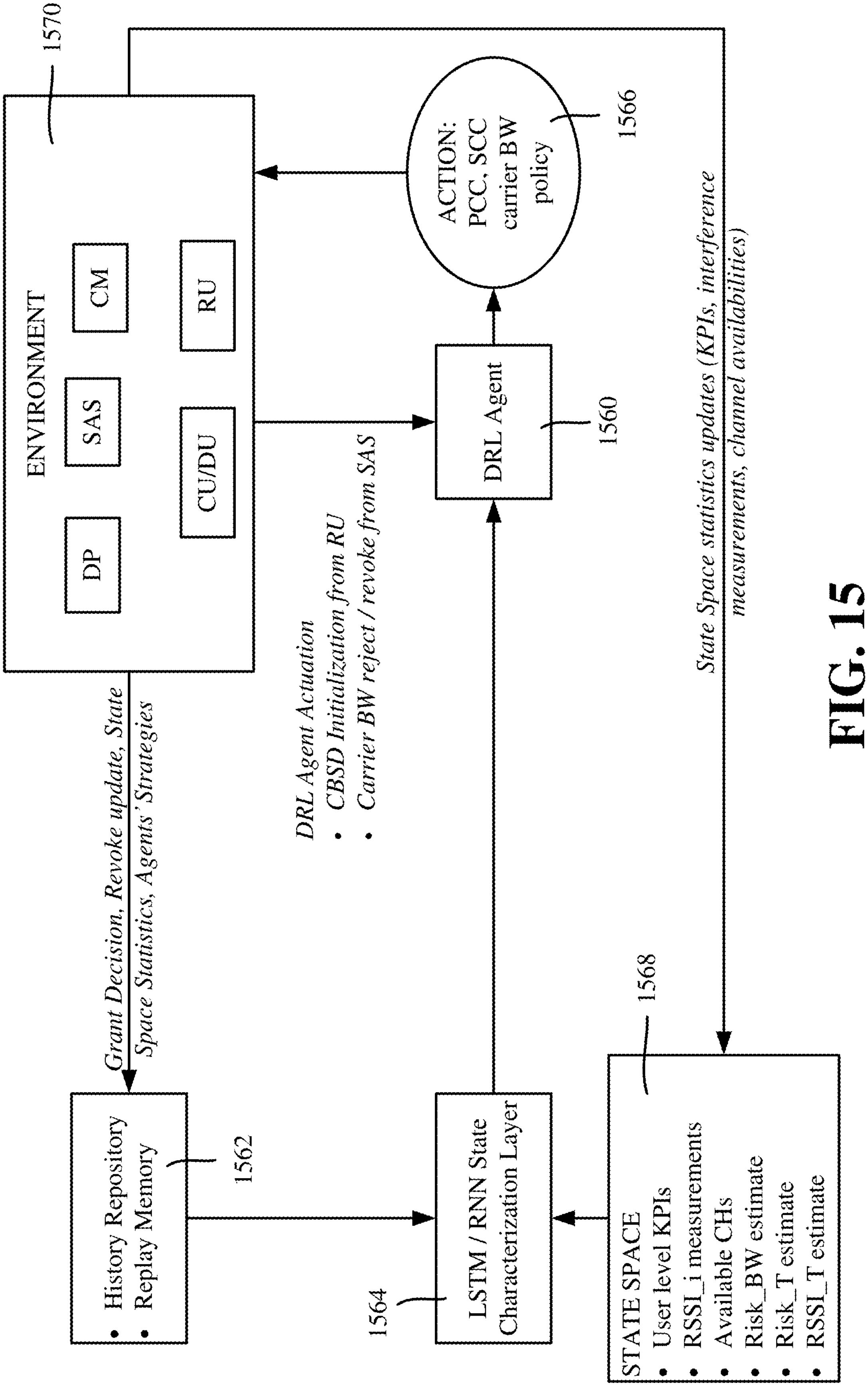
FIG. 15 is a block diagram representation of an example artificial intelligence/machine learning system that operates to select CBRS spectrum, in accordance with various implementations and embodiments of the subject disclosure.

The AI models 1560 and 1654 (within the rApp) are actuated during initial deployment of a CBSD by a radio unit, and/or when the CBRS grant is revoked (either during the initial request or when a high priority incumbent or priority access license user accesses the spectrum). Note that the example embodiment of FIG. 15 depicts a DRL agent implementation for a single radio unit; notwithstanding, in alternative examples, there may be multiple radio units served by a single service management and orchestration platform 102. In such alternatives, each radio unit has a DRL-based model (as an rApp) within the service management and orchestration platform 102. Each such DRL agent maximizes its expected utility while keeping the intent of other agents under consideration. Each agent selects an action in this intent-aware multi-agent setup by leveraging knowledge from current state space observation and a history repository from which each agent infers the other agents' intents. The purpose of the coordinated grant request system is to ensure that the radio units do not swamp the same spectrum, which consequently degrades the KPIs.

In general, the goal of each agent is to maximize the long-term return of taking an action, which may be achieved by using episodic memory (called replay memory in block 1562, which stores agents' experience of the past) to govern future decisions.

The memory-based learning model layer 1564 is used prior to the reinforcement model 1560 for improved learning and prediction of network dynamics. While experience replay data stores previous actions to train the neural network, a decision on an action in a state can be made based only on the observed state (block 1568) of the environment 1570, disregarding the previous states. Thus, to improve the model performance as well as convergence time, the memory-based model composed recurrent neural network (RNN) or long short-term memory (LSTM) layer 1564 is added, which not only provides the agent with memory, but also enables representation learning, which improves performance in both fully observable and not fully observable domains.

This memory-based layer 1564 operates as a state characterization layer, which leverages RNNs/LSTMs to predict network dynamics, resulting from time-varying parameters; that is, RNN and LSTM can use time series-type data temporal dependencies between consecutive data points. With a regularly varying traffic load and carrier availabilities, memory-based RL models such as RNN use a hidden state to update the recurrent connections to leverage information from previous states, and utilize that knowledge to improve the learning. In one example, the memory-based RL model can take time-stamped statistics as input from the environment to predict more optimal carrier bandwidth policies using previous action and reward space trends under consideration.

The RNN/LSTM layer 1564 can thus predict the time-varying network dynamics in the environment 1570 (e.g., the Interference RSSI measurements), while the Actor-Critic agent (RL model) optimizes the continuous action space, e.g., the primary component carrier and secondary component carrier bandwidth selection action (block 1566). In the case of carrier aggregation, the agents can propose different policies for the primary component carrier and secondary component carrier, because grant denial or revocation of the primary component carrier endures a stronger penalty in the reward for the agents.

To summarize, as represented in FIG. 15, the agent 1560 uses data in the history repository and replay memory (block 1562), and state space 1568 of the environment 1570 to recommend policy data 1566 for primary component carrier and secondary component carrier bandwidth allocations using an intent-based reinforcement learning utility that aims to maximize bandwidth allocations and minimize the CBRS grant rejections and revocations. The environment 1570 (e.g., via the domain proxy, DP) relays the grant decisions and revocations (which are used to calculate the episodic agent reward) to the DRL agent 1560, as well as to the history repository 1562. The state space database 1568 is also updated (e.g., periodically) with the user level performance KPIs as well as channel availability and interference statistics. The Risk_BW, Risk_T and RSSI_T estimates are also available in the state space 1568 of each radio unit in order to facilitate the bandwidth recommendations as well as faster convergence of the DRL algorithm. Similar flows exist for any other DRL agents corresponding to any other RUs. The strategies of other agents and the corresponding grant decisions from SAS are stored in the common history repository, which is used by each agent to infer a belief about other agents' CBRS strategies.

The LSTM/RNN based state characterization layer improves the performance, in that the instantaneous state space (user level KPIs, RSSI measurements and so on) may not be visible at the DRL agent 1560. To overcome the incomplete state knowledge and any errors in RSSI measurements, the memory-based state layer 1564 predicts the state space and feeds that to the DRL agent 1560. The ability of LSTMs/RNNs to capture temporal dependencies between time-series data points enables them to predict network dynamics.

The memory-based model uses the time-stamped historical data from the repository on the network states, as well as previous grant requests, decisions and revocations to predict on the network statistics, as well as grant decisions for future requests. This information aids the DRL agent in making a CBRS bandwidth selection that has a higher probability of acceptance and increases the duration before which the access may be revoked.

Figure 16:
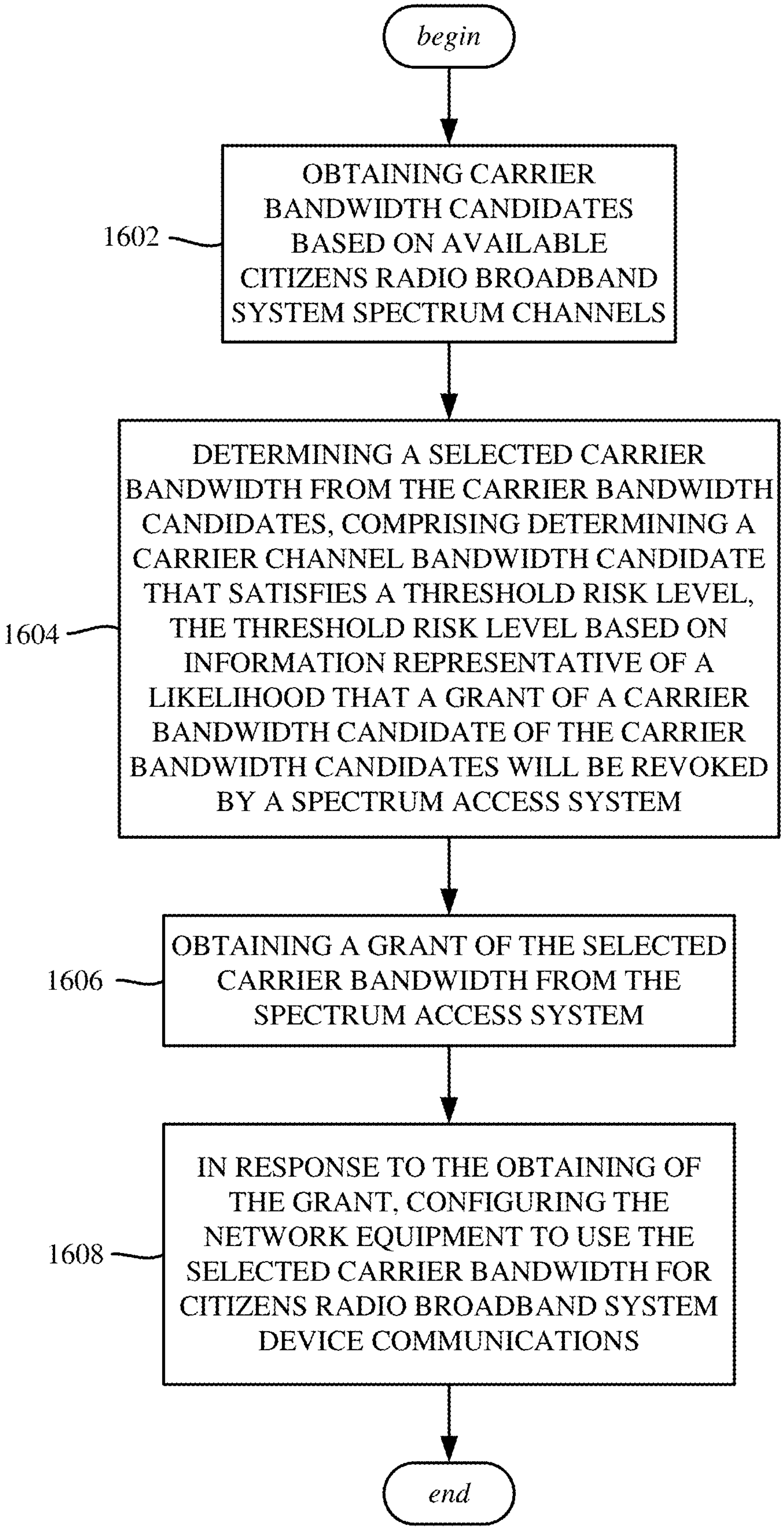
FIG. 16 is a flow diagram showing example operations related to determining a selected carrier bandwidth from CBRS carrier bandwidth candidates based on a risk level of being revoked, in accordance with various implementations and embodiments of the subject disclosure.

One or more implementations and embodiments can be embodied in network equipment, such as represented in the example operations of FIG. 16, and for example can include a memory that stores computer executable components and/or operations, and at least one processor that executes computer executable components and/or operations stored in the memory. Example operations can include operation 1602, which represents obtaining carrier bandwidth candidates based on available citizens radio broadband system spectrum channels. Example operation 1604 represents determining a selected carrier bandwidth from the carrier bandwidth candidates, comprising determining a carrier channel bandwidth candidate that satisfies a threshold risk level, the threshold risk level based on information representative of a likelihood that a grant of a carrier bandwidth candidate of the carrier bandwidth candidates will be revoked by a Spectrum Access System. Example operation 1606 represents obtaining a grant of the selected carrier bandwidth from the Spectrum Access System. Example operation 1608 represents, in response to the obtaining of the grant, configuring the network equipment to use the selected carrier bandwidth for citizens radio broadband system device communications.

The threshold risk level can be based on at least one of: a service availability performance indicator evaluated with respect to a service availability performance threshold value, a downlink throughput performance indicator evaluated with respect to a downlink throughput performance threshold value, an uplink throughput performance indicator evaluated with respect to an uplink throughput performance threshold value, a downlink delay performance indicator evaluated with respect to a downlink delay performance threshold value, or an uplink delay performance indicator evaluated with respect to an uplink delay performance threshold value.

Determining the selected carrier bandwidth can include selecting a carrier bandwidth candidate with a largest carrier bandwidth that satisfies a risk threshold value representative of the threshold risk level.

Further operations can include obtaining respective interference data for respective carrier bandwidth candidates of the carrier bandwidth candidates; determining the selected carrier bandwidth can include determining the selected carrier bandwidth, from among the respective carrier bandwidth candidates, that is a respective carrier bandwidth candidate with a largest carrier bandwidth that satisfies the threshold risk level, and, based on the respective interference data of the respective carrier bandwidth candidate, satisfies an interference threshold value. The respective interference data can include respective received signal strength indicator data, and the interference threshold value can be based on at least one of: a downlink throughput performance indicator evaluated with respect to a downlink throughput performance threshold value, an uplink throughput performance indicator evaluated with respect to an uplink throughput performance threshold value, a downlink delay performance indicator evaluated with respect to a downlink delay performance threshold value, an uplink delay performance indicator evaluated with respect to an uplink delay performance threshold value, or the respective received signal strength indicator data evaluated with respect to a received signal strength indicator threshold value.

Obtaining the grant of the selected carrier bandwidth can include communicating with the Spectrum Access System via a domain proxy.

The citizens radio broadband system device can be capable of citizens radio broadband system device communications using at least two component carriers, the selected carrier bandwidth can be a first selected carrier bandwidth, the grant of the selected carrier bandwidth can include a first grant, and further operations can include determining, from the carrier bandwidth candidates, a second selected carrier bandwidth, other than the first selected carrier bandwidth, that satisfies the threshold risk level, obtaining a second grant of the second selected carrier bandwidth from the Spectrum Access System, and, in response to the obtaining of the second grant, configuring the network equipment to use the first selected carrier bandwidth as a secondary component carrier for the citizens radio broadband system device communications, and the second selected carrier bandwidth as a primary component carrier for the citizens radio broadband system device communications. Note however that the technology described herein also can be used for a scenario in which only one component carrier is supported by the CBSD(s). The secondary component carrier can have a larger bandwidth than a bandwidth of the primary component carrier, or the primary component carrier can have a larger bandwidth than a bandwidth of the secondary component carrier.

Determining the selected carrier bandwidth from the carrier bandwidth candidates can be performed by a radio access network (RAN) intelligent controller RAN application (rApp). The rApp can include rule-based logic. The rApp can include a deep reinforcement learning model.

Figure 17:
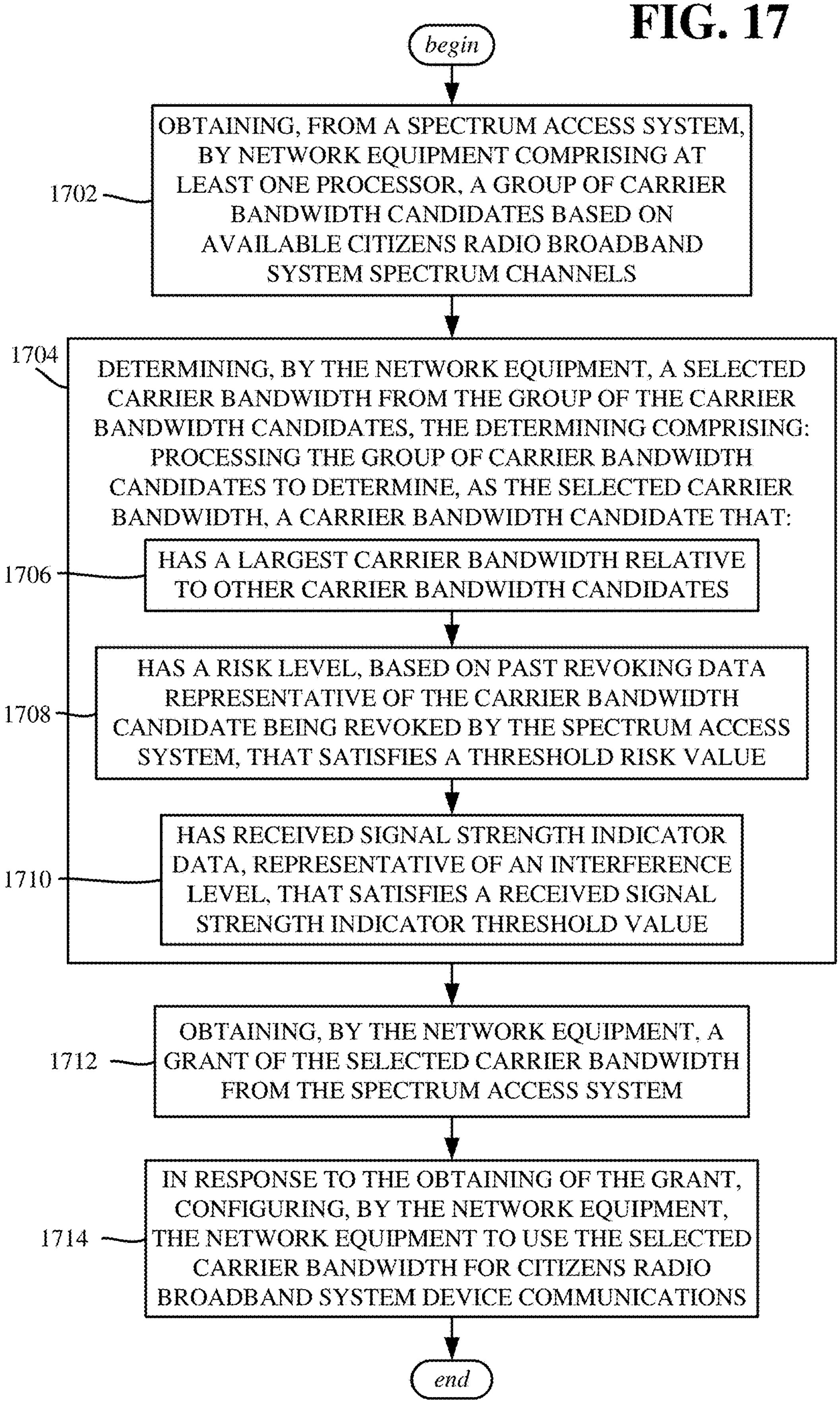
FIG. 17 is a flow diagram showing example operations related to determining a selected carrier bandwidth from CBRS carrier bandwidth candidates based on bandwidth size, a risk level of being revoked, and received signal strength indicator data representative of interference, in accordance with various implementations and embodiments of the subject disclosure.

One or more example implementations and embodiments, such as corresponding to example operations of a method, are represented in FIG. 17. Example operation 1702 represents obtaining, from a Spectrum Access System, by network equipment comprising at least one processor, a group of carrier bandwidth candidates based on available citizens radio broadband system spectrum channels. Example operation 1704 represents determining, by the network equipment, a selected carrier bandwidth from the group of the carrier bandwidth candidates; the determining can include processing the group of carrier bandwidth candidates to determine, as the selected carrier bandwidth, a carrier bandwidth candidate that has a largest carrier bandwidth relative to other carrier bandwidth candidates (block 1706), has a risk level, based on past revoking data representative of the carrier bandwidth candidate being revoked by the Spectrum Access System, that satisfies a threshold risk value (block 1708), and has received signal strength indicator data, representative of an interference level, that satisfies a received signal strength indicator threshold value (block 1710). Example operation 1712 represents obtaining, by the network equipment, a grant of the selected carrier bandwidth from the Spectrum Access System. Example operation 1714 represents, in response to the obtaining of the grant, configuring, by the network equipment, the network equipment to use the selected carrier bandwidth for citizens radio broadband system device communications.

Configuring the network equipment to use the selected carrier bandwidth can include configuring the selected carrier bandwidth as a primary component carrier for the citizens radio broadband system device communications.

The selected carrier bandwidth can be a first selected carrier bandwidth, the grant can be a first grant, configuring the network can include configuring the first selected carrier bandwidth as a secondary component carrier for the citizens radio broadband system device communications, and further operations can include, determining, by the network equipment, a second selected carrier bandwidth from the group of the carrier bandwidth candidates; the determining can include processing the group of carrier bandwidth candidates to determine, as the second selected carrier bandwidth, a carrier bandwidth candidate that has a next largest carrier bandwidth relative to other carrier bandwidth candidates, obtaining, by the network equipment, a second grant of the second selected carrier bandwidth from the Spectrum Access System; and, in response to the obtaining of the second grant, configuring, by the network equipment, the network equipment to use the second selected carrier bandwidth as a primary component carrier for the citizens radio broadband system device communications citizens radio broadband system device communications.

The risk level can be a first risk level, and wherein the second selected carrier can have a second risk level, based on past revoking data representative of the second selected carrier being revoked by the Spectrum Access System, that satisfies the threshold risk value.

The received signal strength indicator data can be first received signal strength indicator data representative of a first interference level, and the second selected carrier can have received signal strength indicator data, representative of a second interference level, that satisfies the received signal strength indicator threshold value.

Determining the selected carrier bandwidth can be performed by a deep reinforcement learning agent based on current environment state data comprising at least one of: performance indicator data, the received signal strength indicator data, the available channel data, or risk level data corresponding to channels of the available channel data.

Processing of the group of carrier bandwidth candidates can include ranking the carrier bandwidth candidates, in an ordered data structure, from highest bandwidth carrier bandwidth candidates to lowest bandwidth carrier bandwidth candidates, removing, from the ordered data structure, at least one carrier bandwidth candidate having an associated risk level that does not satisfy the risk threshold value, and removing, from the ordered data structure, at least one carrier bandwidth candidate having associated received signal strength indicator data that does not satisfy the received signal strength indicator threshold value.

Figure 18:
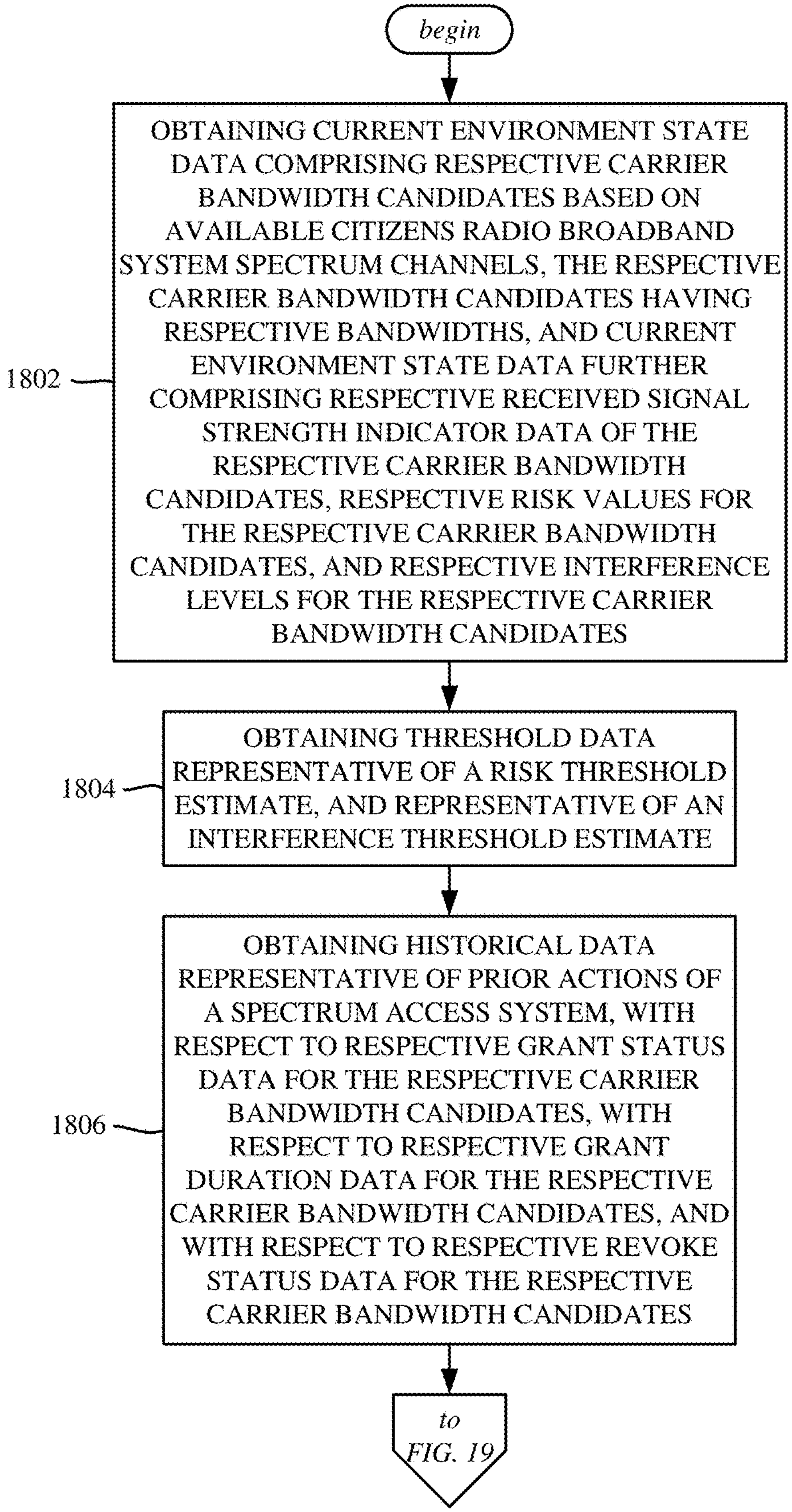
FIGS. 18 and 19 comprise a flow diagram showing example operations related to receiving an identified carrier bandwidth from a deep reinforcement learning agent that prioritizes candidates based on bandwidth size, risk data and interference data, in accordance with various implementations and embodiments of the subject disclosure.
Figure 19:
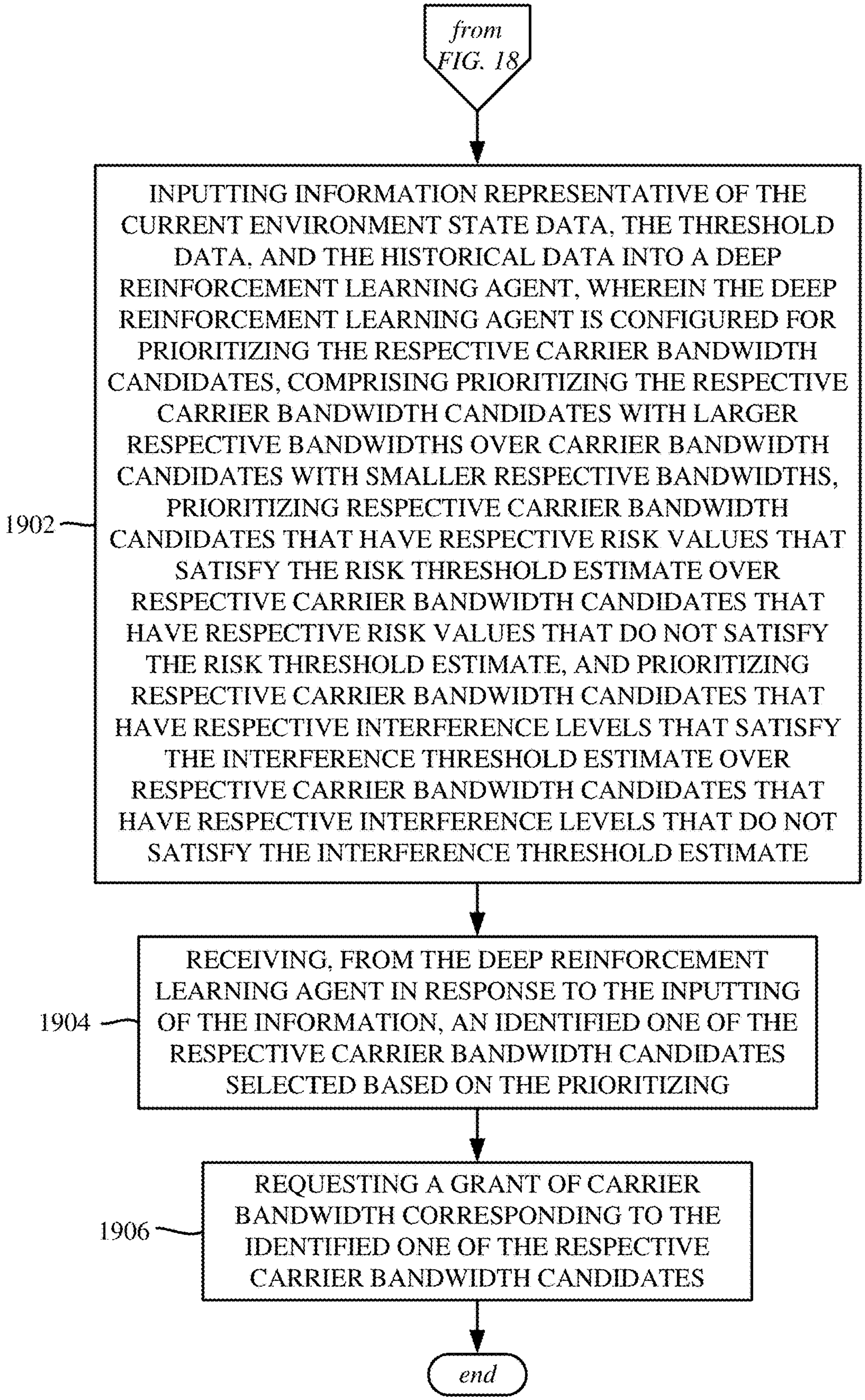

FIGS. 18 and 19 summarize various example operations, e.g., corresponding to a machine-readable medium, comprising executable instructions that, when executed by a processor, that, when executed by at least one processor of network equipment, facilitate performance of operations. Example operation 1802 of FIG. 18 represents obtaining current environment state data comprising respective carrier bandwidth candidates based on available citizens radio broadband system spectrum channels, the respective carrier bandwidth candidates having respective bandwidths, and current environment state data further comprising respective received signal strength indicator data of the respective carrier bandwidth candidates, respective risk values for the respective carrier bandwidth candidates, and respective interference levels for the respective carrier bandwidth candidates. Example operation 1804 represents obtaining threshold data representative of a risk threshold estimate, and representative of an interference threshold estimate. Example operation 1806 represents obtaining historical data representative of prior actions of a Spectrum Access System, with respect to respective grant status data for the respective carrier bandwidth candidates, with respect to respective grant duration data for the respective carrier bandwidth candidates, and with respect to respective revoke status data for the respective carrier bandwidth candidates. The operations continue at FIG. 19, where example operation 1902 represents inputting information representative of the current environment state data, the threshold data, and the historical data into a deep reinforcement learning agent, wherein the deep reinforcement learning agent is configured for prioritizing the respective carrier bandwidth candidates, comprising prioritizing the respective carrier bandwidth candidates with larger respective bandwidths over carrier bandwidth candidates with smaller respective bandwidths, prioritizing respective carrier bandwidth candidates that have respective risk values that satisfy the risk threshold estimate over respective carrier bandwidth candidates that have respective risk values that do not satisfy the risk threshold estimate, and prioritizing respective carrier bandwidth candidates that have respective interference levels that satisfy the interference threshold estimate over respective carrier bandwidth candidates that have respective interference levels that do not satisfy the interference threshold estimate. Example operation 1904 represents receiving, from the deep reinforcement learning agent in response to the inputting of the information, an identified one of the respective carrier bandwidth candidates selected based on the prioritizing. Example operation 1906 represents requesting a grant of carrier bandwidth corresponding to the identified one of the respective carrier bandwidth candidates.

The identified one of the respective carrier bandwidth candidates can be a first identified one of the respective carrier bandwidth candidates, the requesting of the grant can include requesting of a first grant of first carrier bandwidth, and further operations can include receiving, from the deep reinforcement learning agent in response to the inputting of the information, a second identified one of the respective carrier bandwidth candidates selected based on the prioritizing, requesting a second grant of second carrier bandwidth corresponding to the second identified one of the respective carrier bandwidth candidates, receiving the first grant, receiving the second grant, and configuring network equipment to use the first carrier bandwidth as a primary component carrier for the citizens radio broadband system device communications, and to use the second carrier bandwidth as a secondary component carrier for the citizens radio broadband system device communications.

As can be seen, the technology described herein achieves better CBRS system performance relative to existing solutions in which the carrier bandwidth is statically determined without considering the risk of the spectrum being revoked and/or the interference per each deployment scenario. This is based on the technology described herein, which deals with the multi-dimensional complexity of carrier bandwidth selection, including that determining an optimized bandwidth of the CBRS carrier is based on taking into consideration the RAN (CU/DU and RU) capability, whether the carrier is primary component carrier versus a secondary component carrier, the available CBRS spectrum chunks, interference, and risk of a carrier getting revoked. Some of those factors are variable per each geolocation/CBRS deployment, which also can change from time to time. The technology described herein can be implemented with O-RAN compliance.

Figure 20:
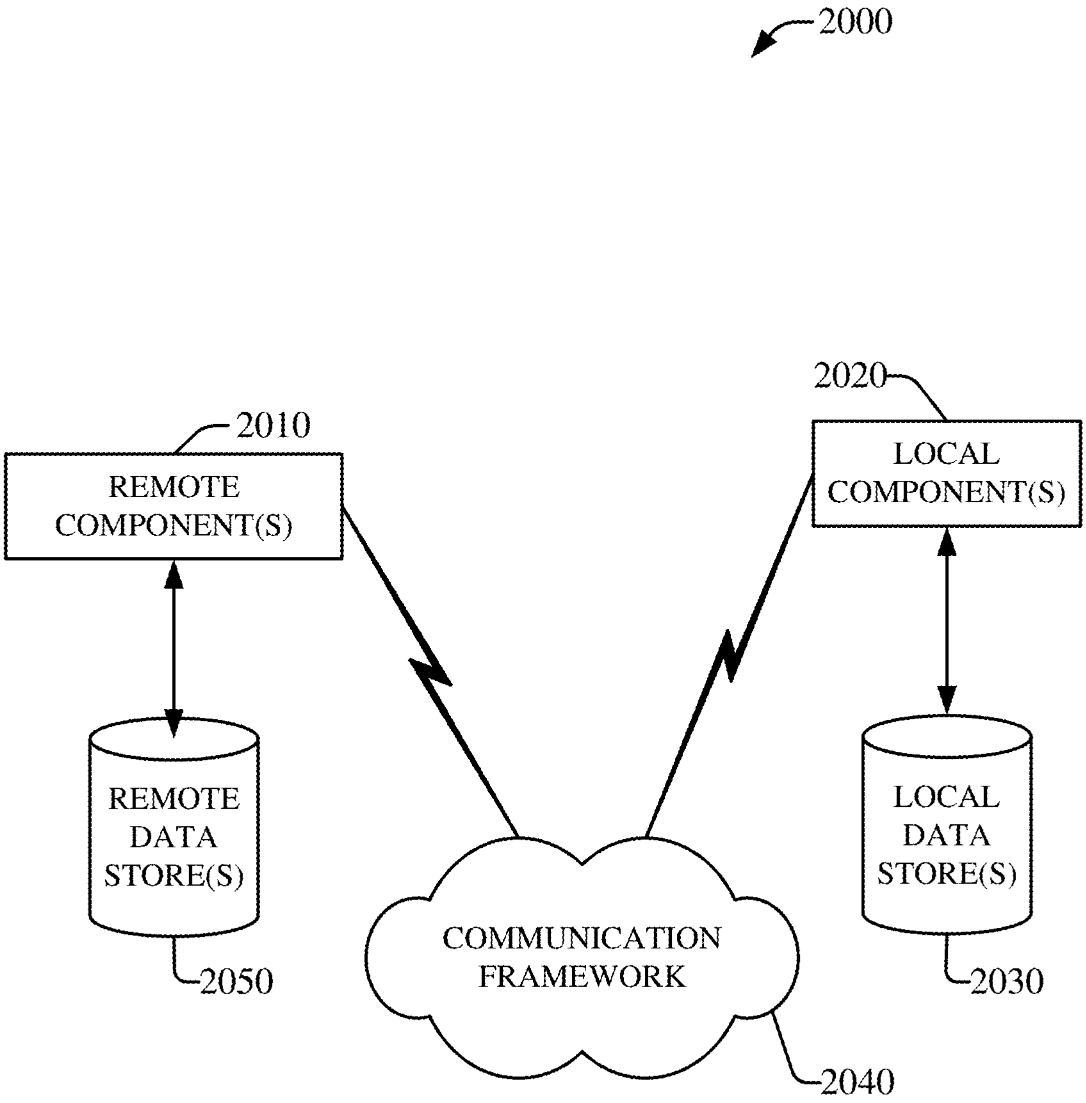
FIG. 20 is a block diagram representing an example computing environment into which the subject matter described herein may be incorporated and/or may communicate.

FIG. 20 is a schematic block diagram of a computing environment 2000 with which the disclosed subject matter can interact. The system 2000 can include one or more remote component(s) 2010. The remote component(s) 2010 can be hardware and/or software (e.g., threads, processes, computing devices). In some embodiments, remote component(s) 2010 can be a distributed computer system, connected to a local automatic scaling component and/or programs that use the resources of a distributed computer system, via communication framework 2040. Communication framework 2040 can comprise wired network devices, wireless network devices, mobile devices, wearable devices, radio access network devices, gateway devices, femtocell devices, servers, etc.

The system 2000 also comprises one or more local component(s) 2020. The local component(s) 2020 can be hardware and/or software (e.g., threads, processes, computing devices). In some embodiments, local component(s) 2020 can comprise an automatic scaling component and/or programs that communicate/use the remote resources 2010, etc., connected to a remotely located distributed computing system via communication framework 2040.

One possible communication between a remote component(s) 2010 and a local component(s) 2020 can be in the form of a data packet adapted to be transmitted between two or more computer processes. Another possible communication between a remote component(s) 2010 and a local component(s) 2020 can be in the form of circuit-switched data adapted to be transmitted between two or more computer processes in radio time slots. The system 2000 comprises a communication framework 2040 that can be employed to facilitate communications between the remote component(s) 2010 and the local component(s) 2020, and can comprise an air interface, e.g., Uu interface of a UMTS network, via a long-term evolution (LTE) network, etc. Remote component(s) 2010 can be operably connected to one or more remote data store(s) 2050, such as a hard drive, solid state drive, SIM card, device memory, etc., that can be employed to store information on the remote component(s) 2010 side of communication framework 2040. Similarly, local component(s) 2020 can be operably connected to one or more local data store(s) 2030, that can be employed to store information on the local component(s) 2020 side of communication framework 2040.

Figure 21:
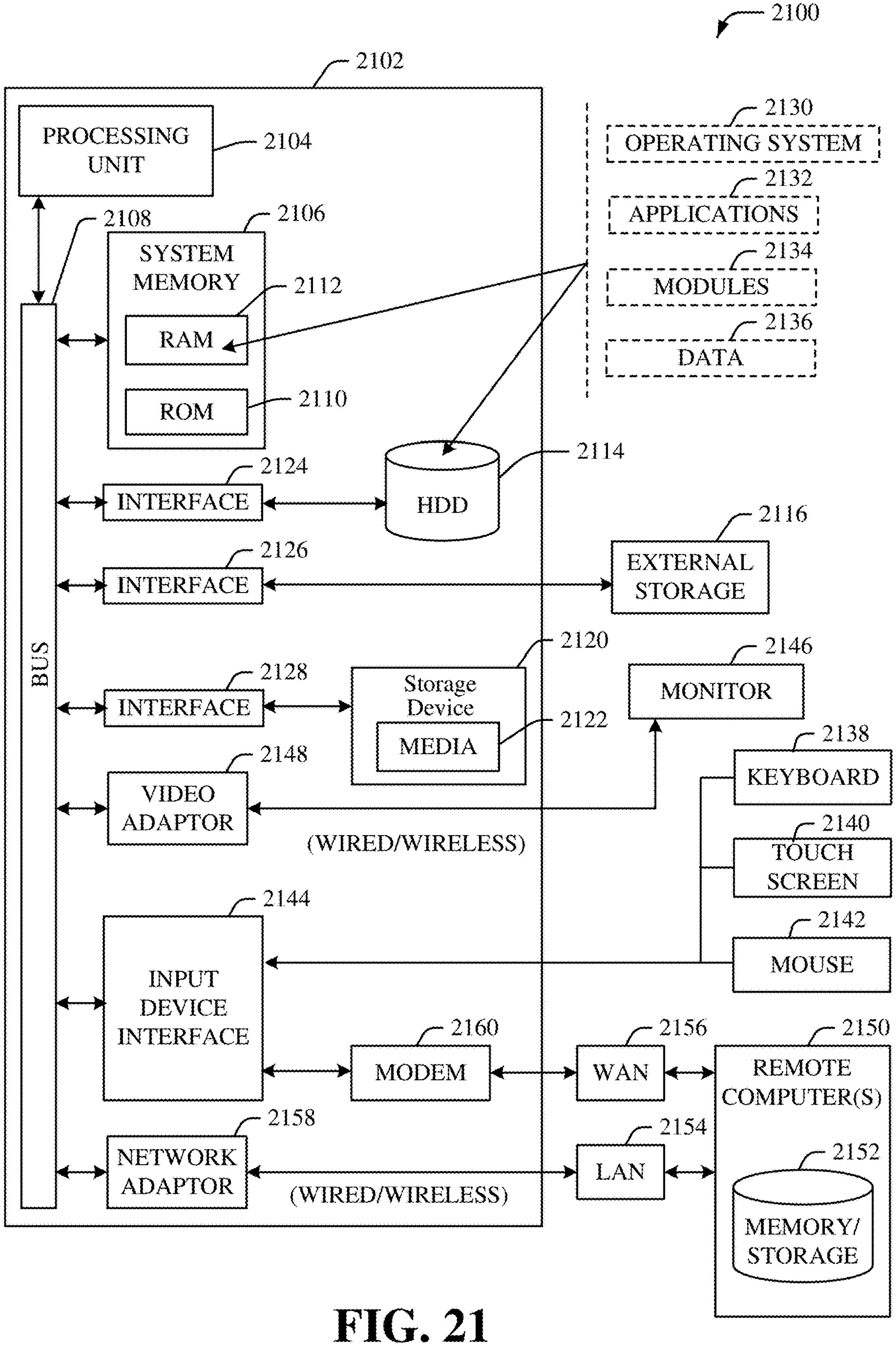
FIG. 21 depicts an example schematic block diagram of a computing environment with which the disclosed subject matter can interact/be implemented at least in part, in accordance with various implementations and embodiments of the subject disclosure.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various implementations and embodiments described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), and can include one or more external storage devices 2116 (e.g., a magnetic floppy disk drive (FDD) 2116, a memory stick or flash drive reader, a memory card reader, etc.). While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114.

Other internal or external storage can include at least one other storage device 2120 with storage media 2122 (e.g., a solid state storage device, a nonvolatile memory device, and/or an optical disk drive that can read or write from removable media such as a CD-ROM disc, a DVD, a BD, etc.). The external storage 2116 can be facilitated by a network virtual machine. The HDD 2114, external storage device(s) 2116 and storage device (e.g., drive) 2120 can be connected to the system bus 2108 by an HDD interface 2124, an external storage interface 2126 and a drive interface 2128, respectively.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 2194 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired and/or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network (LAN) 2154 and/or larger networks, e.g., a wide area network (WAN) 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired and/or wireless communication network interface or adapter 2158. The adapter 2158 can facilitate wired or wireless communication to the LAN 2154, which can also include a wireless access point (AP) disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/storage device 2152. It will be appreciated that the network connections shown are examples and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 and/or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

at least one processor; and at least one memory that stores executable instructions that, when executed by the at least one processor, facilitate performance of operations, the operations comprising:

obtaining, from a Spectrum Access System, carrier bandwidth candidates based on available citizens radio broadband system spectrum channels;

determining a selected carrier bandwidth from the carrier bandwidth candidates, the determining comprising:

processing the carrier bandwidth candidates to determine, as the selected carrier bandwidth, a carrier bandwidth candidate that:

has a largest carrier bandwidth relative to other carrier bandwidth candidates, has a risk level, based on past revoking data representative of the carrier bandwidth candidate being revoked by the Spectrum Access System, that satisfies a threshold risk value, and has received signal strength indicator data, representative of an interference level, that satisfies a received signal strength indicator threshold value;

obtaining a grant of the selected carrier bandwidth from the Spectrum Access System; and in response to the obtaining of the grant, configuring the network equipment to use the selected carrier bandwidth for citizens radio broadband system device communications.

2. The network equipment of claim 1, wherein the threshold risk level is based on at least one of: a service availability performance indicator evaluated with respect to a service availability performance threshold value, a downlink throughput performance indicator evaluated with respect to a downlink throughput performance threshold value, an uplink throughput performance indicator evaluated with respect to an uplink throughput performance threshold value, a downlink delay performance indicator evaluated with respect to a downlink delay performance threshold value, or an uplink delay performance indicator evaluated with respect to an uplink delay performance threshold value.

3. The network equipment of claim 1, wherein the determining of the selected carrier bandwidth comprises selecting a carrier bandwidth candidate with a largest carrier bandwidth that satisfies a risk threshold value representative of the threshold risk level.

4. The network equipment of claim 1, wherein the operations further comprise obtaining respective interference data for respective carrier bandwidth candidates of the carrier bandwidth candidates, and wherein the determining of the selected carrier bandwidth comprises determining the selected carrier bandwidth, from among the respective carrier bandwidth candidates, that is a respective carrier bandwidth candidate with a largest carrier bandwidth that satisfies the threshold risk level, and, based on the respective interference data of the respective carrier bandwidth candidate, satisfies an interference threshold value.

5. The network equipment of claim 4, wherein the respective interference data comprises respective received signal strength indicator data, and wherein the interference threshold value is based on at least one of: a downlink throughput performance indicator evaluated with respect to a downlink throughput performance threshold value, an uplink throughput performance indicator evaluated with respect to an uplink throughput performance threshold value, a downlink delay performance indicator evaluated with respect to a downlink delay performance threshold value, an uplink delay performance indicator evaluated with respect to an uplink delay performance threshold value, or the respective received signal strength indicator data evaluated with respect to a received signal strength indicator threshold value.

6. The network equipment of claim 1, wherein the obtaining of the grant of the selected carrier bandwidth comprises communicating with the Spectrum Access System via a domain proxy.

7. The network equipment of claim 1, wherein the citizens radio broadband system device is capable of the citizens radio broadband system device communications using at least two component carriers, wherein the selected carrier bandwidth is a first selected carrier bandwidth, wherein the grant of the selected carrier bandwidth comprises a first grant, and wherein the operations further comprise determining, from the carrier bandwidth candidates, a second selected carrier bandwidth, other than the first selected carrier bandwidth, that satisfies the threshold risk level, obtaining a second grant of the second selected carrier bandwidth from the Spectrum Access System, and, in response to the obtaining of the second grant, configuring the network equipment to use the first selected carrier bandwidth as a secondary component carrier for the citizens radio broadband system device communications, and the second selected carrier bandwidth as a primary component carrier for the citizens radio broadband system device communications.

8. The network equipment of claim 7, wherein the secondary component carrier has a larger bandwidth than a bandwidth of the primary component carrier, or wherein the primary component carrier has a larger bandwidth than a bandwidth of the secondary component carrier.

9. The network equipment of claim 1, wherein the determining of the selected carrier bandwidth from the carrier bandwidth candidates is performed by a radio access network (RAN) intelligent controller RAN application (rApp).

10. The network equipment of claim 9, wherein the rApp comprises rule-based logic.

11. The network equipment of claim 9, wherein the rApp comprises a deep reinforcement learning model.

12. A method, comprising:

obtaining, from a Spectrum Access System, by network equipment comprising at least one processor, a group of carrier bandwidth candidates based on available citizens radio broadband system spectrum channels;

determining, by the network equipment, a selected carrier bandwidth from the group of the carrier bandwidth candidates, the determining comprising:

processing the group of carrier bandwidth candidates to determine, as the selected carrier bandwidth, a carrier bandwidth candidate that:

has a largest carrier bandwidth relative to other carrier bandwidth candidates, has a risk level, based on past revoking data representative of the carrier bandwidth candidate being revoked by the Spectrum Access System, that satisfies a threshold risk value, and has received signal strength indicator data, representative of an interference level, that satisfies a received signal strength indicator threshold value;

obtaining, by the network equipment, a grant of the selected carrier bandwidth from the Spectrum Access System; and in response to the obtaining of the grant, configuring, by the network equipment, the network equipment to use the selected carrier bandwidth for citizens radio broadband system device communications.

13. The method of claim 12, wherein the configuring the network equipment to use the selected carrier bandwidth comprises configuring the selected carrier bandwidth as a primary component carrier for the citizens radio broadband system device communications.

14. The method of claim 12, wherein the selected carrier bandwidth is a first selected carrier bandwidth, wherein the grant is a first grant, wherein the configuring of the network equipment comprises configuring the first selected carrier bandwidth as a secondary component carrier for the citizens radio broadband system device communications, and further comprising, determining, by the network equipment, a second selected carrier bandwidth from the group of the carrier bandwidth candidates, the determining comprising:

processing the group of carrier bandwidth candidates to determine, as the second selected carrier bandwidth, a carrier bandwidth candidate that has a next largest carrier bandwidth relative to other carrier bandwidth candidates, obtaining, by the network equipment, a second grant of the second selected carrier bandwidth from the Spectrum Access System; and in response to the obtaining of the second grant, configuring, by the network equipment, the network equipment to use the second selected carrier bandwidth as a primary component carrier for the citizens radio broadband system device communications citizens radio broadband system device communications.

15. The method of claim 14, wherein the risk level is a first risk level, and wherein the second selected carrier has a second risk level, based on past revoking data representative of the second selected carrier being revoked by the Spectrum Access System, that satisfies the threshold risk value.

16. The method of claim 15, wherein the received signal strength indicator data is first received signal strength indicator data representative of a first interference level, and wherein the second selected carrier has received signal strength indicator data, representative of a second interference level, that satisfies the received signal strength indicator threshold value.

17. The method of claim 12, wherein the determining of the selected carrier bandwidth is performed by a deep reinforcement learning agent based on current environment state data comprising at least one of: performance indicator data, the received signal strength indicator data, available channel data, or risk level data corresponding to channels of the available channel data.

18. The method of claim 12, wherein the processing of the group of carrier bandwidth candidates comprises ranking the carrier bandwidth candidates, in an ordered data structure, from highest bandwidth carrier bandwidth candidates to lowest bandwidth carrier bandwidth candidates, removing, from the ordered data structure, at least one carrier bandwidth candidate having an associated risk level that does not satisfy a risk threshold value, and removing, from the ordered data structure, at least one carrier bandwidth candidate having associated received signal strength indicator data that does not satisfy the received signal strength indicator threshold value.

19. A non-transitory machine-readable medium, comprising executable instructions that, when executed by at least one processor of network equipment, facilitate performance of operations, the operations comprising:

obtaining current environment state data comprising respective carrier bandwidth candidates based on available citizens radio broadband system spectrum channels, the respective carrier bandwidth candidates having respective bandwidths, and current environment state data further comprising respective received signal strength indicator data of the respective carrier bandwidth candidates, respective risk values for the respective carrier bandwidth candidates, and respective interference levels for the respective carrier bandwidth candidates;

obtaining threshold data representative of a risk threshold estimate, and representative of an interference threshold estimate;

obtaining historical data representative of prior actions of a Spectrum Access System, with respect to respective grant status data for the respective carrier bandwidth candidates, with respect to respective grant duration data for the respective carrier bandwidth candidates, and with respect to respective revoke status data for the respective carrier bandwidth candidates;

inputting information representative of the current environment state data, the threshold data, and the historical data into a deep reinforcement learning agent, wherein the deep reinforcement learning agent is configured for prioritizing the respective carrier bandwidth candidates, comprising prioritizing the respective carrier bandwidth candidates with larger respective bandwidths over carrier bandwidth candidates with smaller respective bandwidths, prioritizing respective carrier bandwidth candidates that have respective risk values that satisfy the risk threshold estimate over respective carrier bandwidth candidates that have respective risk values that do not satisfy the risk threshold estimate, and prioritizing respective carrier bandwidth candidates that have respective interference levels that satisfy the interference threshold estimate over respective carrier bandwidth candidates that have respective interference levels that do not satisfy the interference threshold estimate;

receiving, from the deep reinforcement learning agent in response to the inputting of the information, an identified one of the respective carrier bandwidth candidates selected based on the prioritizing; and requesting a grant of carrier bandwidth corresponding to the identified one of the respective carrier bandwidth candidates.

20. The non-transitory machine-readable medium of claim 19, wherein the identified one of the respective carrier bandwidth candidates is a first identified one of the respective carrier bandwidth candidates, wherein the requesting of the grant comprises requesting of a first grant of first carrier bandwidth, and wherein the operations further comprise:

receiving, from the deep reinforcement learning agent in response to the inputting of the information, a second identified one of the respective carrier bandwidth candidates selected based on the prioritizing, requesting a second grant of second carrier bandwidth corresponding to the second identified one of the respective carrier bandwidth candidates, receiving the first grant, receiving the second grant, and configuring network equipment to use the first carrier bandwidth as a primary component carrier for the citizens radio broadband system device communications, and to use the second carrier bandwidth as a secondary component carrier for the citizens radio broadband system device communications.

* * * * *